(12) United States Patent
Welte

(10) Patent No.: US 11,608,828 B2
(45) Date of Patent: *Mar. 21, 2023

(54) ROTARY PUMP WITH AXIAL COMPENSATION, OUTLET GASKET FOR A PUMP AND PRE-FITTED PUMP UNIT

(71) Applicant: Schwäbische Hüttenwerke Automotive GmbH, Aalen-Wasseralfingen (DE)

(72) Inventor: Claus Welte, Aulendorf (DE)

(73) Assignee: Schwäbische Hüttenwerke Automotive GmbH, Aalen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/416,820

(22) PCT Filed: Dec. 27, 2019

(86) PCT No.: PCT/EP2019/087116
§ 371 (c)(1),
(2) Date: Jun. 21, 2021

(87) PCT Pub. No.: WO2020/136270
PCT Pub. Date: Jul. 2, 2020

(65) Prior Publication Data
US 2021/0396226 A1    Dec. 23, 2021

(30) Foreign Application Priority Data
Dec. 28, 2018    (DE) .................... 10 2018 133 679.9

(51) Int. Cl.
| F04C 15/00 | (2006.01) |
| F04C 2/344 | (2006.01) |
| F01C 19/00 | (2006.01) |

(52) U.S. Cl.
CPC ........ *F04C 15/0003* (2013.01); *F01C 19/005* (2013.01); *F04C 2/344* (2013.01); *F04C 15/0026* (2013.01)

(58) Field of Classification Search
CPC .... F01C 19/005; F04C 15/0003; F04C 2/344; F04C 15/0026

See application file for complete search history.

(56) References Cited

U.S. PATENT DOCUMENTS

| 3,752,609 A | 8/1973 | Niemiec et al. |
| 4,257,753 A | 3/1981 | Sakamaki et al. |

(Continued)

FOREIGN PATENT DOCUMENTS

| CN | 101469702 A | 7/2009 |
| CN | 106050647 A | 10/2016 |

(Continued)

OTHER PUBLICATIONS

Inventors: Uwe et al, Machine Translation of German Patent Publication DE 102015017078 A1, 2016. (Year: 2016).*

(Continued)

*Primary Examiner* — Mary Davis
(74) *Attorney, Agent, or Firm* — RatnerPrestia

(57) ABSTRACT

A pump for supplying an assembly with a pressure fluid, the pump including: a pump housing including a circumferential wall, surrounding the pump's, a first end-face wall and a second end-face wall which delineate the delivery chamber at its end-face sides; a rotor, rotatable about an axis of rotation in the delivery chamber, for forming delivery cells; a pressure outlet which emerges on an outer end-face side of the first end-face wall facing away from the delivery chamber and through which pressure fluid can be discharged from the delivery chamber; an outlet gasket provided on the outer end-face side of the first end-face wall, for sealing off the pressure outlet; a holder in a holding engagement with the outlet gasket and which positions the circumferential wall (Continued)

and the end-face walls relative to each other and axially holds them together as a pre-fitted fitting unit by the holding engagement.

21 Claims, 10 Drawing Sheets

(56) References Cited

U.S. PATENT DOCUMENTS

| | | | |
|---|---|---|---|
| 6,817,847 | B2 | 11/2004 | Agner |
| 10,633,972 | B2 | 4/2020 | Welte |
| 2016/0305427 | A1 | 10/2016 | Welte |
| 2016/0305428 | A1 | 10/2016 | Welte et al. |
| 2017/0260979 | A1 | 9/2017 | Müller et al. |
| 2018/0283373 | A1* | 10/2018 | Sugihara ............... F04C 2/344 |
| 2018/0372097 | A1 | 12/2018 | Welte et al. |
| 2021/0254619 | A1* | 8/2021 | Welte ............... F04C 15/0026 |

FOREIGN PATENT DOCUMENTS

| | | |
|---|---|---|
| CN | 107559187 A | 1/2018 |
| DE | 2306064 A | 8/1973 |
| DE | 2423773 A1 | 11/1975 |
| DE | 2902301 A1 | 8/1979 |
| DE | 19631846 A1 | 2/1997 |
| DE | 102015017078 A1 | 10/2016 |
| DE | 102015105928 A1 | 10/2016 |
| EP | 3081741 A2 | 10/2016 |
| GB | 1513436 A | 6/1978 |
| WO | 0194791 A1 | 12/2001 |

OTHER PUBLICATIONS

International Preliminary Report on Patentability and Written Opinion for International Application No. PCT/EP2019/087116, dated Jun. 16, 2021, 8 pages (English).
International Preliminary Report on Patentability and Written Opinion for International Application No. PCT/EP2019/087116, dated Jun. 16, 2021, 6 pages (German).
International Search Report and Written Opinion issued in PCT/EP2019/087116, dated Mar. 27, 2020, 11 pages.
German Search Report issued in German Patent Application No. 10 2018 133 679.9, dated Sep. 6, 2019, with partial English translation, 6 pages.
Chinese Office Action for Chinese Application No. 201980086555.3, dated Jul. 21, 2022, with translation, 22 pages.

* cited by examiner

ROTARY PUMP WITH AXIAL COMPENSATION, OUTLET GASKET FOR A PUMP AND PRE-FITTED PUMP UNIT

CROSS REFERENCE TO RELATED APPLICATION

This application is a U.S. National Phase application of PCT/EP2019/087116, filed Dec. 27, 2019, which claims benefit of priority to German Patent Application No. 10 2018 133 679.9, filed Dec. 28, 2018. The contents of these applications being incorporated herein in its entirety.

FIELD OF THE INVENTION

The invention relates to a rotary pump which is configured to axially compensate for component and/or installation tolerances, temperature-induced changes in geometry and pressure-induced movements. Additionally, the invention relates to an outlet gasket for a pump, which can in particular be embodied as a rotary pump, and also to the pump including the outlet gasket. The pump can be a single-flux or multi-flux pump, in particular a multi-circuit pump. Lastly, the invention also relates to a pre-fitted pump unit and/or fitting unit. The pump can be used as a gear pump for supplying a gearbox, for example an automatic gearbox or steering gearbox of a vehicle or a gearbox of a wind turbine, with pressure fluid. In yet another use, it can be used as a lubricating oil pump for supplying a combustion engine, for example a drive motor of a vehicle, with lubricating oil. It is likewise conceivable to use it as a combined lubricating oil pump and gear pump, in particular in embodiments in which the pump is a multi-flux pump. The pump can advantageously be embodied as a cartridge.

BACKGROUND OF THE INVENTION

WO 01/94791 A1, incorporated herein by reference, discloses a pump in the form of a pump insert which is arranged in an accommodating well of an accommodating device. The pump insert comprises a circumferential wall, which surrounds a delivery chamber of the pump, and two end-face walls which delineate the delivery chamber on its two end-face sides. A rotor comprising vanes is arranged in the delivery chamber such that it can rotate about an axis of rotation. The delivery chamber is sub-divided by means of the vanes into delivery cells which periodically increase and decrease in size as the rotor rotates in order to deliver pressure fluid from a low-pressure side of the pump to a high-pressure side. The pump insert is arranged axially between a base of the accommodating well and a cover of the accommodating device. When the pump is in operation, the pressure fluid is suctioned into the delivery chamber from a suction space extending over the outer circumference of the pump insert and delivered through one end-face wall into a pressure space formed between said end-face wall and the base of the accommodating well, whence it is discharged. An annular sealing element, which surrounds the relevant end-face wall and acts as a radial gasket, separates the pressure space from the suction space. A spring device which is arranged in the pressure space tenses the pump insert axially against the cover. The pump insert can be axially moved to a minor extent relative to the accommodating device, against the force of the spring device, such that component tolerances and changes in geometry can be compensated for, wherein the end-face wall is axially guided by the accommodating device in the region of the radial gasket. The pump has two working fluxes which jointly deliver into the pressure space, i.e. the working fluxes are not separated from each other; the pump is embodied as a single-circuit pump.

EP 3 081 741 A2, incorporated herein by reference, discloses a gear pump comprising multiple working fluxes. The pump is embodied as a multi-circuit pump. The pump correspondingly comprises separate pressure outlets which are sealed off from each other, with at least one pressure outlet for each flux. In example embodiments, a first pressure outlet is sealed off by means of an annular radial gasket which surrounds a housing of the pump. An annular outlet gasket, which is arranged within the pressure space obtained by means of the radial gasket, surrounds a second pressure outlet in a seal, in order to separate the second pressure outlet from the first pressure outlet. The pump is embodied as a cartridge and is introduced into an accommodating well of an accommodating device, for example a housing of an automatic gearbox, with an outer end-face side of the pump housing first. A pressure fluid delivered by the pump is discharged via the pressure outlets and via pressure ports of the accommodating device which lie axially opposite the pressure outlets. A spring device is supported on a base of the accommodating well and presses with a spring force against the outer end-face side of the pump housing which faces axially opposite, thus enabling tolerances and changes in geometry in the axial direction to be compensated for.

US 2017/0260979 A1, incorporated herein by reference, discloses a gasket arrangement for a vane cell pump cartridge, wherein the vane cell pump has two working fluxes and is embodied as a dual-circuit pump. The gasket arrangement comprises: a radial gasket which is arranged such that it encircles the circumference of an end-face wall of the pump housing and which separates a first pressure space of the pump from the suction space; and an outlet gasket which is arranged on an outer end-face side of the end-face wall. The outlet gasket separates the first pressure space from a second pressure space of the pump and seals off a shaft passage for a drive shaft of the pump by encircling the shaft passage.

SUMMARY OF THE INVENTION

An aspect of the invention is a pump which is suitable for arranging in an accommodating well of an accommodating device and which has for this purpose a housing end-face wall comprising one or more pressure outlets for discharging a pressure fluid from a delivery chamber of the pump. The intention is to better seal off the one or more pressure outlets of such a pump with regard to component and/or installation tolerances of the accommodating device and pump and/or temperature-induced changes in geometry and/or pressure-induced movements of housing structures of the pump.

A pump, such as an aspect of the invention relates to, comprises a pump housing featuring a delivery chamber and a rotor which can be rotated in the delivery chamber about an axis of rotation in order to form delivery cells which periodically increase and decrease again in size when the rotor is rotated, in order to deliver pressure fluid from a low-pressure side of the pump to a high-pressure side of the pump. The pump housing has a circumferential wall, which surrounds the delivery chamber of the pump, a first end-face wall and a second end-face wall, wherein the end-face walls delineate the delivery chamber at its end-face sides. A pressure outlet for pressure fluid delivered from the delivery chamber emerges on an outer end-face side of the first end-face wall facing away from the delivery chamber. The pump comprises an outlet gasket which is provided for sealing off the pressure outlet on the outer end-face side of the first end-face wall.

The pump housing can be fitted or can already be fitted, by means of a fitting structure, on an accommodating device provided at the fitting location. When the pump is said to be fitted or able to be fitted "on" an accommodating device, this also includes fitting it within the accommodating device. The fitting structure can be a component part of the pump. It can be provided in addition to the pump housing or can be formed by one of the pump housing components mentioned, for example the second end-face wall. In alternative embodiments, a fitting structure can be provided as a component part of the accommodating device and thus externally in relation to the pump.

The accommodating device can in particular be a housing of an assembly to be supplied with the pressure fluid, such as a gearbox or an engine. When its is fitted, an attaching wall of the accommodating device lies axially opposite the first end-face wall of the pump housing. The attaching wall of the accommodating device can in particular be a base of an accommodating well for the pump. A pressure port, via which the pressure fluid flowing through the pressure outlet can be discharged, emerges on the attaching wall of accommodating device. The outlet gasket serves to establish a sealed fluid connection between the pressure outlet of the pump and the pressure port of the accommodating device.

The pump can comprise a pressing device for charging the outlet gasket with a pressing force. The pressing force acts on the outlet gasket in an axial direction away from the fitting structure, in order to press the latter into a sealing contact with the attaching wall. The fitting structure can in particular be configured to absorb the reaction force acting in the opposite axial direction.

In a first embodiment, the pump housing—which comprises at least the circumferential wall, the first end-face wall arranged on an axial end-face side of the circumferential wall, and the second end-face wall arranged on the axially opposite end-face side of the circumferential wall—can be axially moved relative to the fitting structure and is axially supported on the fitting structure via the pressing device. In advantageous variants of the first embodiment, in which the pump housing and the fitting structure and optionally the outlet gasket form a pre-fitted fitting unit, the pump housing can be held, such that it can be axially moved, at the installation location on the fitting structure even before being fitted.

In a second embodiment, the outlet gasket can instead be axially moved relative to the pump housing and is axially supported on the pump housing via the pressing device. In advantageous variants of the second embodiment, in which the pump housing and the outlet gasket and optionally a fitting structure provided in addition to the pump housing form a pre-fitted fitting unit, the outlet gasket can be held, such that it can be axially moved, at the installation location on the pump housing and/or on the fitting structure even before being fitted.

In a third embodiment, the pump housing can be axially moved relative to the fitting structure, and the outlet gasket can be axially moved relative to the pump housing, wherein the pump housing is axially supported on the fitting structure via the pressing device, or the outlet gasket is axially supported on the pump housing via the pressing device. In the third embodiment, it is also possible for the pump housing to be axially supported on the fitting structure via the pressing device and for the outlet gasket to be axially supported on the pump housing via another pressing device.

In advantageous variants of the third embodiment, in which the pump housing, the fitting structure and the outlet gasket form a pre-fitted fitting unit, the pump housing is held, such that it can be axially moved, on the fitting structure even before being fitted at the installation location, and the outlet gasket is held, such that it can be axially moved, on the pump housing and/or on the fitting structure even before being fitted at the installation location.

When the pump is fitted at the installation location, the pressing force presses the outlet gasket against the attaching wall of the accommodating device in order to connect the pressure outlet of the pump housing and the pressure port of the accommodating device to each other and separate them from the environment. If the pump is arranged in an accommodating well of the accommodating device, a base of the accommodating well can in particular form the attaching wall. It is then ensured by means of the pressing device and the pressing force generated by it that the outlet gasket is pressed against the base of the accommodating well which lies axially opposite the first end-face wall. The ability of the outlet gasket to axially move together with the pump housing relative to the fitting structure and/or to axially move relative to the pump housing ensures, in combination with the axial pressing force which can be generated by means of pressing device, to an increased extent that the outlet gasket reliably seals off the pressure outlet and the pressure port of the accommodating device despite component tolerances and/or installation tolerances of the accommodating device and the pump and/or temperature-induced changes in geometry and/or pressure-induced axial movements of the pump housing as a whole or of parts of the pump housing.

If the pump housing can be axially moved relative to the fitting structure, then in preferred embodiments, the pump housing and the fitting structure together form a prismatic joint in which the fitting structure guides the pump housing such that it can be axially moved. If the outlet gasket can be axially moved relative to the pump housing, then in preferred embodiments, the pump housing and the outlet gasket form a prismatic joint in which the pump housing guides the outlet gasket such that it can be axially moved. In embodiments in which the pump housing can be axially moved relative to the fitting structure, and the outlet gasket can be axially moved relative to the pump housing, both prismatic joints can be implemented. In simple and not least for this reason advantageous embodiments, however, either only the pump housing can be moved, such that it is axially guided, relative to the fitting structure or only the outlet gasket can be moved, such that it is axially guided, relative to the pump housing.

The pressing device can comprise a spring device, which also includes the scenario in which the pressing device is a spring device, i.e. consists of a spring device. The spring device can act pneumatically and/or mechanically. A mechanical spring device comprising one or more springs is preferred. Alternatively, the pressing force can be generated hydraulically, i.e. the pressing device can be formed as a purely hydraulic pressing device. In developments, the pressing device can comprise both a spring device and a hydraulic pressing device.

The pump housing can be fitted with an axial bias by means of the spring device, thus ensuring that the outlet gasket is constantly pressed into an axial sealing contact by a biasing force and that the first end-face wall and/or the second end-face wall is/are constantly pressed axially towards the circumferential wall by a biasing force. This can ensure the strength of seal when the pump is at a standstill and thus directly as the pump is started, for example during an initial start or a cold start. The pressing force can be increased while the pump is in operation by means of a hydraulic pressing device, in order for example to compensate for a pressure prevailing in the delivery chamber on the high-pressure side, which increases with the rotational speed of the rotor, and to ensure the strength of seal on the pump housing and the sealing function of the outlet gasket even at high rotational speeds of the rotor and/or in the event of pressure spikes due to pressure pulsation. If the pressing device comprises a spring device and a hydraulic pressing device which is operated using pressure fluid from the high-pressure side of the pump, the spring device can be arranged with a biasing force which is sufficiently large to ensure the strength of seal in the lower rotational speed range when at operating temperatures, i.e. when pressure fluid exhibits low viscosity. At the same time, the biasing force can be sufficiently low that the outlet gasket shows a certain lack of seal during a cold start, when the pressure fluid exhibits a correspondingly high viscosity, and for example rises out of the sealing contact, against the pressing force of the spring device, in order to reduce a pressure spike which typically occurs during a cold start.

If the pressing device comprises a spring device which is arranged with a bias, the pump housing is axially supported on the fitting structure and/or the outlet gasket is axially supported on the pump housing in all operating states of the fitted, against the restoring pressing force of the pressing device. If the pressing device acts only pneumatically or only hydraulically, the pressing device can in particular be configured such that it generates the pressing force only when the pump is in operation. This applies above all to embodiments in which a purely pneumatic pressing device or a purely hydraulic pressing device generates the pressing force as a function of the pressure of the pressure fluid delivered by the pump.

In embodiments in which the pump housing can be axially moved relative to the fitting structure, regardless of whether the pressing device is implemented as a purely hydraulic pressing device or as a hydraulic pressing device in combination with a spring device, the pump housing and the fitting structure together—or the pump housing and the fitting structure together with the accommodating device—form a piston-cylinder unit with the pump housing as a piston, in order to implement the hydraulic pressing device, wherein the hydraulic pressure acts on the pump housing and is axially supported on the fitting structure. In advantageous embodiments, the fitting structure surrounds the cylinder space of the piston-cylinder unit on the outer circumference, i.e. it encloses the cylinder space at the circumference, such that just the pump housing and the fitting structure together already form the piston-cylinder unit. Although less preferred, it is however in principle also possible for the cylinder space to be obtained only by combining the pump housing and fitting structure with the accommodating device, in that the accommodating device surrounds the cylinder space and delineates it at the circumference.

In embodiments in which the outlet gasket can be axially moved relative to the pump housing, and the pressing device acts between the pump housing and the outlet gasket, the outlet gasket is supported in an axial direction on the pump housing via the pressing device. For these embodiments, it is advantageous if the pressing device is a spring device comprising one or more mechanical springs or at least comprises such a mechanical spring device. The outlet gasket which can be axially moved relative to the pump housing can act as a radial gasket in relation to the pump housing and seal off the pressure outlet in co-operation with a circumferential wall of the pump housing which surrounds the pump outlet, by forming a radial sealing gap with the circumferential wall of the pump housing. The outlet gasket which can be axially moved maintains the sealing gap with said circumferential wall of the pump housing across the axial extent of its ability to move.

In embodiments in which tolerances and/or changes in geometry are not compensated for by means of a pump housing which can be moved relative to the fitting structure but rather only by means of an outlet gasket which can be axially moved relative to the pump housing, the fitting structure can be a fixed component part of the pump housing and can for example be formed by the second end-face wall. In preferred embodiments, however, the fitting structure is produced separately from the pump housing, and the fitting structure and pump housing together form a pre-fitted fitting unit in which the pump housing can be axially moved relative to the fitting structure.

The circumferential wall of the pump housing can be formed in an original-moulding method, optionally with subsequent machining, together with the first end-face wall or instead together with the second end-face wall. In advantageous embodiments, however, the circumferential wall, the first end-face wall and the second end-face wall are three separately formed parts which are arranged axially next to each other. In such embodiments, the pump housing is constructed in layers. The end-face walls are each other pressed axially towards the circumferential wall, at least when the pump is fitted, in order to enclose the delivery chamber in a seal, aside from a delivery chamber inlet on the low-pressure side and a delivery chamber outlet on the high-pressure side. Preferably, the first end-face wall is arranged directly on a first end-face side of the circumferential wall, and the second end-face wall is arranged directly on the opposite end-face side of the circumferential wall, and they are pressed axially against the circumferential wall, at least when the pump is fitted.

In advantageous embodiments, the pump housing and the fitting structure form a pre-fitted pump unit, i.e. a fitting unit. In such embodiments, the pump comprises a securing device comprising one or more holders which ensures or which together ensure that the pre-fitted components of the pump hold together. The fitting unit comprises at least the circumferential wall, the first end-face wall and the second end-face wall of the pump housing, the rotor arranged in the pump housing, and optional rotor vanes. It is advantageous if the outlet gasket is also a pre-fitted component part of the fitting unit. The securing device can then hold the outlet gasket in position on the pump housing in a holding engagement between the holder and the outlet gasket. Additionally or instead, the one or more holders of the securing device can be in a holding engagement with the first end-face wall and hold the pump housing together when pre-fitted. If the holding engagement is formed with the first circumferential wall, the outlet gasket can be held on the first end-face wall by means of a plug connection. If the outlet gasket is (respectively) in holding engagement with the one or more holders of the securing device, it can additionally be held on the first end-face wall by means of a plug connection.

The pressing device is expediently an integrated component part of the fitting unit. If the fitting structure is a component of the pump in addition to the pump housing, this fitting structure can also be a pre-fitted component part of the fitting unit. It is advantageous if the components of the fitting unit are held in position relative to each other by means of the securing device such that for fitting purposes, the fitting unit need only then be pressed axially against said attaching wall of the accommodating device, with the outlet gasket first, and axially fixed on the accommodating device by means of the pre-fitted or externally provided fitting structure, in order to bring the components of the pump for operating the pump into position relative to each other and relative to the accommodating device and fix them there.

Providing a fitting unit in which the pump housing and at least the outlet gasket as well are held in position relative to each other by means of a securing device when pre-fitted, wherein the securing device is in a holding engagement with the outlet gasket for this purpose, is advantageous even without implementing the axial compensation and/or pressing device in accordance with an aspect of the invention. In preferred embodiments, however, a pressing device, i.e. the spring device and/or the hydraulic pressing device, is/are already a component part of the pre-fitted pump unit, i.e. the fitting unit. Providing said components of the pump in the form of a fitting unit makes them easier to install at the designated location, i.e. easier to attach to the accommodating device. This benefits series productions in particular, since the pump components do not have to be individually fed into the series production and only then assembled within the context of fitting, for example in series as with engines or gearboxes, but rather are already pre-fitted to form the pump unit beforehand, typically by the manufacturer of the pump components, and accordingly provided as a fitting unit for final assembly in a series production.

The pump can be formed with only one working flux, i.e. it can be a single-flux pump. In preferred embodiments, the pump is embodied as a multi-flux pump, for example a dual-flux pump, and accordingly has a first working flux and at least another, second working flux. In multi-flux embodiments, the pressure outlet can be a pressure outlet which is common to the multiple working fluxes and the pump can accordingly be a multi-flux single-circuit pump. More preferably, however, the pump which is embodied as a multi-flux pump is also embodied as a multi-circuit pump and accordingly has pressure outlets which are sealed off from each other, i.e. separate pressure outlets, for different working fluxes. When the pump is embodied as a multi-circuit pump, the pressure outlet already explained is a first pressure outlet for the first working flux of the pump only, while the pump has a dedicated second pressure outlet for the at least one other, second working flux, and these at least two pressure outlets are fluidically separated from each other.

When the pump is embodied as a multi-circuit pump comprising the first pressure outlet and the second pressure outlet, the outlet gasket can be formed as a gasket unit which separates these two pressure outlets from each other and also separates each of them from the low-pressure side of the pump. In relation to the second pressure outlet, the outlet gasket expediently likewise exhibits the features disclosed above and also below with respect to the one pressure outlet and/or the first pressure outlet. If the pump which is embodied as a multi-circuit pump has a first working flux comprising the first pressure outlet and a second working flux comprising the second pressure outlet, which is separate from the first pressure outlet, the outlet gasket can have a first sealing stay for the first pressure outlet and a second sealing stay for the second pressure outlet. The first sealing stay surrounds the first pressure outlet in a seal and separates the first pressure outlet from the low-pressure side of the pump and the second pressure outlet. The second sealing stay surrounds the second pressure outlet in a seal and separates the second pressure outlet from the low-pressure side of the pump and the first pressure outlet. In advantageous embodiments, the first sealing stay and the second sealing stay are connected to form a unit; they are preferably formed together in an original-moulding method, for example in a plastic moulding method.

In advantageous embodiments, the outlet gasket comprises a support structure made for example of a metal material or plastic, and a gasket structure made of a gasket material suitable for performing the sealing function, such as for example a rubber material or expediently an elastomer material. The gasket material forms at least one gasket stay which encircles the pressure outlet. In multi-circuit pump embodiments, the gasket structure formed from the gasket material comprises the first sealing stay and the second sealing stay. The gasket structure can for example be formed as or comprise a protruding gasket flange. Within the cross-section which the respective sealing stay encloses and in which the associated pressure outlet emerges, the support structure can have one or more passages such that the support structure forms a sort of shutter, for example a perforated shutter, for the respective pressure outlet. The flow in the transitional region between the pressure outlet and the pressure port can be calmed by means of such a support structure. The support structure can in particular be sheet-like in shape, i.e. it can be a planarly thin structure. It can simply be planar in the shape of a disc, but more preferably has the shape of a flat cover or is curved three-dimensionally and comprises one or more sealing flange(s), each acting as a sealing stay, and a bulge protruding from the respective sealing flange.

While the features disclosed above and below with regard to the outlet gasket, such as for example the presence of a support structure made of a first material and a comparatively more flexible gasket structure made of a gasket material, and/or the particular embodiment of the outlet gasket for use as an outlet gasket of a multi-circuit pump, for example a dual-circuit pump, are used in preferred embodiments in combination with the features of a pump in accordance with an aspect of the invention, these features are however conversely also advantageous in principle, i.e. even in a pump in which the described ability to axially move relatively is not implemented and/or in which a pressing device in accordance with an aspect of the invention is not provided. An outlet gasket itself, which is suitable for sealing off a first flux and a second flux of a multi-circuit pump, preferably a rotary pump, and/or which has a support structure which not only serves to support the gasket structure but is also designed as a flow resistance, in order to reduce pressure spikes at the pressure outlet, can also be the subject of an application of its own.

Thus, an aspect of the invention provides an outlet gasket for a pump which is suitable for performing multiple functions but which can still be easily fitted on a housing of the pump.

In accordance with a first aspect, provided is an outlet gasket for a multi-circuit pump. The outlet gasket shall be able to separate a first working flux and a second working flux of the pump from each other and from a low-pressure side of the pump. It shall thus perform a first sealing function in relation to the first working flux and a second sealing function in relation to the second working flux, but still be easy to fit.

In accordance with a second aspect, provided is an outlet gasket for a pump, wherein the outlet gasket shall be able to perform a sealing function and to assist in reducing pressure spikes. Pressure spikes can typically occur during a cold start, when the pressure fluid is viscous.

It is also an aspect of the invention to provide a pump comprising a multi-functional outlet gasket.

In accordance with the first aspect, the outlet gasket has a gasket structure, made of a gasket material, for sealing off an outlet region of a multi-circuit pump. The outlet region comprises a first pressure outlet and a second pressure outlet which are to be fluidically separated from each other and also in each case from a low-pressure side of the pump by means of the outlet gasket. The gasket structure comprises: a first sealing stay which circumferentially encloses a first fluid passage of the outlet gasket, provided for the first pressure outlet, in a seal in an axial plan view onto the outlet gasket; and a second sealing stay which circumferentially encloses a second fluid passage of the outlet gasket, provided for the second pressure outlet and located laterally next to the first fluid passage in the plan view, in a seal in the plan view.

The at least two sealing stays, which each encircle one fluid passage next to each other in the axial plan view, are contiguously formed as a uniform gasket structure and/or arranged, preferably moulded, on a support structure of the outlet gasket. In first embodiments, the outlet gasket comprises a support structure, and the sealing stays are arranged contiguously on the support structure, forming the gasket structure as a unit made of the gasket material. In second embodiments, the outlet gasket again comprises a support structure, but the sealing stays are not arranged contiguously, but rather separately from each other, on the support structure. In third embodiments, the sealing stays are contiguously formed from the gasket material, such that they form a uniform gasket structure, but the outlet gasket does not comprise a support structure in addition to the gasket structure made of gasket material. Common to all the embodiments is that the outlet gasket is provided as a unit which can be fitted.

In the axial plan view, each of the fluid passages can exhibit a major axis, a minor axis in the transverse direction orthogonal to the major axis, a maximum longitudinal extent parallel to the major axis, and a maximum transverse extent parallel to the minor axis, wherein the maximum longitudinal extent is greater than the maximum transverse extent. The fluid passages can then for example each be oval or in particular D-shaped in the plan view and can be arranged next to each other in the transverse direction. By means of such a shape and arrangement of the fluid passages, an outer end-face surface of a pump housing which is at least substantially circular in the axial plan view can be mostly used for the at least two fluid passages. If the fluid passages are D-shaped, their flat longitudinal sides advantageously face each other in the transverse direction.

In preferred embodiments, the sealing stays are shaped such that when fitted, they can form an axial gasket with an external attaching wall provided at the installation location of the pump. The sealing stays, or only one of the sealing stays, and the pump housing can together also form an axial gasket based on an axial sealing contact with an axial end-face surface of the pump housing or a radial gasket based on a radial sealing contact with a circumferential surface of the pump housing. In a third variant, the sealing stays or as applicable only one of the sealing stays can form both an axial gasket and a radial gasket with the pump housing.

The gasket structure can be arranged, or provided in order to be arranged, on a pump housing such that it cannot be moved relative to the pump housing. In such embodiments, it can for example be arranged in a correspondingly shaped accommodating groove and/or joined to the pump housing in a material fit. In these embodiments, the outlet gasket can be formed solely by the gasket structure made of the gasket material. The outlet gasket need not have a support structure in such embodiments. It can however also be provided for an arrangement which can be axially moved relative to a housing of the pump. If the outlet gasket is provided for an ability to axially move relative to the pump housing or is arranged such that it can be axially moved on a pump housing, then its inner end-face side which axially faces the pump housing can be shaped such that it co-operates with an end-face surface of the pump housing as an axial gasket. Instead or additionally, it can act as a radial gasket together with a circumferential surface of the pump housing, preferably an inner circumferential surface, wherein said radial gasket constantly remains in radial sealing contact with the circumferential surface of the pump housing over the axial extent of its ability to move relatively.

In an arrangement which can or cannot be moved, it is advantageous if the outlet gasket comprises a support structure in addition to the sealing stays made of gasket material, in order to hold the sealing stays in position relative to each other and, when fitted, relative to the pump housing and/or to rigidify the outlet gasket as a whole. In advantageous embodiments, the outlet gasket is embodied such that it is held on the pump housing in a frictional fit by means of a plug connection in the region of the sealing stays when the pump is pre-fitted. In advantageous embodiments, the plug connection and/or frictional fit is configured such that the outlet gasket can be axially moved relative to the pump housing when the pump is pre-fitted and preferably also when the pump is fitted, including when the outlet gasket acts as a purely axial gasket and in particular when the outlet gasket is provided solely or primarily for a radial sealing contact with the pump housing.

Features of the invention are also described in the aspects formulated below. The aspects are worded in the manner of claims and can substitute for them. Features disclosed in the aspects can also supplement and/or qualify the claims, indicate alternatives with respect to individual features and/or broaden claim features. Bracketed reference signs refer to example embodiments of the invention illustrated below in figures. They do not restrict the features described in the aspects to their literal sense as such, but do conversely indicate preferred ways of implementing the respective feature.

Aspect 1. A pump for supplying an assembly, for example a gearbox, with a pressure fluid, the pump comprising:
1.1 a pump housing (1) comprising a circumferential wall (2), which surrounds a delivery chamber (5) of the pump, a first end-face wall (3) and a second end-face wall (4; 40) which delineate the delivery chamber (5) at its end-face sides;
1.2 a rotor (10), which can be rotated about an axis of rotation (R) in the delivery chamber (5), for forming delivery cells which periodically increase and decrease in size as the rotor (10) rotates, in order to deliver pressure fluid from a low-pressure side of the pump to a high-pressure side of the pump;
1.3 a pressure outlet (8) which emerges on an outer end-face side of the first end-face wall (3) facing away from the delivery chamber (5) and through which pressure fluid can be discharged from the delivery chamber (5); and
1.4 an outlet gasket (14; 44) which is provided on the outer end-face side of the first end-face wall (3), for sealing off the pressure outlet (8),
1.5 wherein the pump housing (1) can be fitted on an accommodating device (35) by means of a fitting structure (20; 40, 41) and the fitting structure (20; 40, 41) is a component part of the pump or accommodating device (35).

Aspect 2. The pump according to the preceding aspect, wherein the pump housing (1) can be fitted on the accommodating device (35) by means of the fitting structure (20; 40, 41), such that the first end-face wall (3) axially faces an attaching wall (37) of the accommodating device (35).

Aspect 3. The pump according to any one of the preceding aspects, wherein the fitting structure (20) has an axial cylindrical guide (23) which surrounds the pump housing (1) in the region of the second end-face wall (4), preferably only the second end-face wall (4), and guides the pump housing (1) such that it can be axially moved.

Aspect 4. The pump according to any one of the preceding aspects, wherein the fitting structure (20) surrounds the pump housing (1) and/or the pump housing (1) surrounds the fitting structure (20) in the region of the second end-face wall (4) with an axial overlap, and the fitting structure (20) guides the pump housing (1) such that it can be axially moved in a sliding contact in the region of the overlap.

Aspect 5. The pump according to any one of the preceding aspects, wherein the pump housing (1) and the fitting structure (20) together form a piston-cylinder arrangement comprising the pump housing (1) as the piston and the fitting structure (20) as the cylinder.

Aspect 6. A pump for supplying an assembly, for example a gearbox, with a pressure fluid, wherein the pump is preferably formed according to any one of the preceding aspects, the pump comprising:
  6.1 a pump housing (1) comprising a circumferential wall (2), which surrounds a delivery chamber (5) of the pump, a first end-face wall (3) and a second end-face wall (4; 40) which delineate the delivery chamber (5) at its end-face sides;
  6.2 a rotor (10), which can be rotated about an axis of rotation (R) in the delivery chamber (5), for forming delivery cells which periodically increase and decrease in size as the rotor (10) rotates, in order to deliver pressure fluid from a low-pressure side of the pump to a high-pressure side of the pump;
  6.3 a pressure outlet (8) which emerges on an outer end-face side of the first end-face wall (3) facing away from the delivery chamber (5) and through which pressure fluid can be discharged from the delivery chamber (5),
  6.4 wherein the pump is optionally a multi-flux pump and has a first flux comprising the pressure outlet as a first pressure outlet (8) and a second flux comprising a second pressure outlet (9) which emerges on the outer end-face side of the first end-face wall (3) next to the first pressure outlet (8); and
  6.5 an outlet gasket (14; 44) which is provided on the outer end-face side of the first end-face wall (3), for sealing off the pressure outlet (8) and also, if provided, the second pressure outlet (9).

Aspect 7. The pump according to the preceding aspect, wherein the pump housing (1) can be fitted on an accommodating device (35) by means of a fitting structure (20; 40, 41), and the fitting structure (20; 40, 41) is a component part of the pump or accommodating device (35).

Aspect 8. The pump according to any one of the preceding aspects, wherein the fitting structure (20) guides the pump housing (1) such that it can be axially moved and/or the pump housing (1) guides the outlet gasket (44) such that it can be axially moved.

Aspect 9. The pump according to any one of the preceding aspects, wherein the pump housing (1) and the fitting structure (20) and/or the pump housing (1) and the outlet gasket (44) together form a prismatic joint (1, 20; 1, 44) which can move axially.

Aspect 10. The pump according to any one of the preceding aspects, further comprising a pressing device (30; 45) for charging the outlet gasket (14; 44) with an axial pressing force for pressing the outlet gasket (14; 44) against an attaching wall (37) of the accommodating device (35) which lies axially opposite the outer end-face side of the first end-face wall (3) when fitted.

Aspect 11. The pump according to the preceding aspect, wherein:
  the pump housing (1) can be axially moved relative to the fitting structure (20) and is axially supported on the fitting structure (20) via the pressing device (45); and/or
  the outlet gasket (44) can be axially moved relative to the pump housing (1) and is axially supported on the pump housing (1) via the pressing device (45).

Aspect 12. The pump according to any one of the immediately preceding two aspects, wherein the pump housing (1) can be axially moved relative to the fitting structure (20) and/or the outlet gasket (44) can be axially moved relative to the pump housing (1), and the outlet gasket (44) is axially supported on the fitting structure (20; 41) via the pressing device (45).

Aspect 13. The pump according to any one of the preceding aspects in combination with Aspect 10, wherein the pressing device (30; 45) comprises a pressure chamber (31) for generating the pressing force by means of hydraulic pressure and/or a spring device (33; 45) for generating the pressing force by means of a spring force.

Aspect 14. The pump according to the preceding aspect, wherein the spring device (33) is arranged in the pressure chamber (31).

Aspect 15. The pump according to any one of the preceding aspects in combination with Aspect 10, wherein the pressing device (30; 45) comprises a spring device (33; 45) which acts in an axial direction between the pump housing (1) and the fitting structure (20) or between the pump housing (1) and the outlet gasket (44) in order to generate a spring force which forms at least part of the pressing force.

Aspect 16. The pump according to any one of the immediately preceding three aspects, wherein the spring device (33; 45) comprises at least one spring which is supported on an end-face wall (21) of the fitting structure (20) or on the first end-face wall (3) of the pump housing (1), wherein the at least one spring is preferably supported directly on the end-face wall (21) of the fitting structure (20) or the first end-face wall (3) of the pump housing (1).

Aspect 17. The pump according to any one of the preceding aspects in combination with Aspect 10, wherein the pressing device (30) comprises a pressure chamber (31) which is axially delineated by the pump housing (1) and can be charged with pressure fluid from the high-pressure side, such that a pressure which can be generated in the pressure chamber (31) acts on the pump housing (1), axially away from the fitting structure (20).

Aspect 18. The pump according to the preceding aspect, wherein an end-face wall (21) of the fitting structure (20) axially delineates the pressure chamber (31).

Aspect 19. The pump according to any one of the preceding aspects in combination with Aspect 13, wherein the pressure chamber (31) is permanently connected to the high-pressure side of the pump or is attached to a shut-off valve or control valve and can be selectively connected to and separated from the high-pressure side of the pump via the shut-off valve or control valve.

Aspect 20. The pump according to any one of the preceding aspects in combination with Aspect 13, wherein the pressure chamber (31) is attached to a shut-off valve or control valve and can be relieved of pressure via the shut-off valve or control valve.

Aspect 21. The pump according to any one of the preceding aspects in combination with Aspect 13, wherein the pressure chamber (31) is connected to the high-pressure side of the delivery chamber (5) within the pump housing (1).

Aspect 22. The pump according to any one of the preceding aspects, wherein the outlet gasket (14) acts as an axial gasket with respect to the pump housing (1), wherein said axial gasket rests against an outer end-face surface of the first end-face wall (3) and forms an axial sealing gap, which surrounds the pressure outlet (8) or first pressure outlet (8), with the outer end-face surface of the first end-face wall (3).

Aspect 23. The pump according to the preceding aspect, wherein the outlet gasket (14) rests loosely against the outer end-face surface of the first end-face wall (3) in an axial pressure contact or is moulded onto the first end-face wall (3), for example in a plastic moulding method.

Aspect 24. The pump according to any one of the preceding aspects, wherein the outlet gasket (44) acts as a radial gasket with respect to the pump housing (1), wherein said radial gasket forms a radial sealing gap, which surrounds the pressure outlet (8) or the first pressure outlet (8), in sliding contact with an inner circumferential surface of the first end-face wall (3).

Aspect 25. The pump according to any one of the preceding aspects, wherein the first end-face wall (3) of the pump housing (1) surrounds the outlet gasket (44) with an axial overlap and/or the outlet gasket (44) surrounds the first end-face wall (3) of the pump housing (1) with an axial overlap, and the pump housing (1) guides the outlet gasket (44), such that it can be axially moved, in a sliding contact in the region of the overlap.

Aspect 26. The pump according to any one of the preceding aspects, wherein the pump is embodied as a multi-flux pump and has a first flux comprising the pressure outlet as a first pressure outlet (8) and a second flux comprising a second pressure outlet (9) which emerges on the outer end-face side of the first end-face wall (3) next to the first pressure outlet (8).

Aspect 27. The pump according to the preceding aspect, wherein the outlet gasket (14; 44) also seals off the second pressure outlet (9) on the outer end-face side of the first end-face wall (3).

Aspect 28. The pump according to the preceding aspect, wherein: the outlet gasket (14; 44) comprises a first sealing stay (18) and a second sealing stay (19); the first sealing stay (18) surrounds the first pressure outlet (8) in a seal and separates it from the low-pressure side of the pump and from the second pressure outlet (9); and the second sealing stay (19) surrounds the second pressure outlet (9) in a seal and separates it from the low-pressure side of the pump and from the first pressure outlet (8).

Aspect 29. The pump according to the preceding aspect, wherein the sealing stays (18, 19) are connected to each other and preferably formed together as a unit.

Aspect 30. The pump according to the preceding aspect, wherein the first end-face wall (3) of the pump housing (1) comprises a passage in a radially central region for mounting a drive shaft (12) of the rotor (10) and/or for lubricating oil for lubricating the drive shaft (12), and the first sealing stay (18) separates the first pressure outlet (8) from the passage, and the second sealing stay (19), if provided, separates the second pressure outlet (9) from the passage.

Aspect 31. The pump according to any one of the immediately preceding three aspects, wherein the first sealing stay (18) and the second sealing stay (19) have a common sealing stay portion (17) comprising an inner end near the axis of rotation (R) and a peripheral end away from the axis of rotation (R), and the common sealing stay portion (17) extends between the first pressure outlet (8) and the second pressure outlet (9).

Aspect 32. The pump according to any one of the preceding aspects, wherein the outlet gasket (14; 44) comprises a gasket structure (16) made of a flexible gasket material, for example a rubber material or elastomer material, for sealing off the pressure outlet (8) and/or the second pressure outlet (9), if provided.

Aspect 33. The pump according to any one of the preceding aspects, wherein the outlet gasket (14; 44) comprises a support structure (15), preferably a three-dimensionally curved, thin support structure (15), and a gasket structure (16) which is connected to the support structure (15) and made of a gasket material, for example a rubber material or elastomer material, for sealing off the pressure outlet (8) and/or the second pressure outlet (9), if provided.

Aspect 34. The pump according to the preceding aspect, wherein the support structure (15) has one or more passages (15e), preferably a plurality of hole-like passages (15e), axially opposite the pressure outlet (8) and/or the second pressure outlet (9), if provided, such that the support structure (15) forms a flow resistance for pressure fluid flowing out of the delivery chamber (5) through the pressure outlet (8) and/or the second pressure outlet (9).

Aspect 35. The pump according to any one of the immediately preceding two aspects, wherein the gasket material is injection-moulded onto the support structure (15) in the form of the gasket structure (16) in an injection-moulding method, or the gasket material is injection-moulded around the support structure (15) in the form of the gasket structure (16) in an injection-moulding method.

Aspect 36. The pump according to any one of the preceding aspects, wherein the outlet gasket (14; 44) is arranged on an outer end-face surface of the first end-face wall (3) of the pump housing (1) and surrounds the pressure outlet (8) and/or the second pressure outlet (9), if provided, on the outer end-face surface of the first end-face wall (3) in an axial plan view.

Aspect 37. The pump according to any one of the preceding aspects, wherein the outlet gasket (14) axially rests against an outer end-face surface of the first end-face wall (3) of the pump housing (1) in order to seal off the first pressure outlet (8) and/or the second pressure outlet (9), if provided, in an axial sealing contact with the first end-face wall (3).

Aspect 38. The pump according to any one of the preceding aspects, wherein the outlet gasket (14') circumferentially surrounds, in a seal, an outer circumferential surface of the pump housing (1) which surrounds the pressure outlet (8) and/or the second pressure outlet (9), if provided, in an axial plan view, in order to seal off the respective pressure outlet (8, 9) in a radial sealing contact with the pump housing (1).

Aspect 39. The pump according to any one of the preceding aspects, wherein the first end-face wall (3) of the pump housing (1) has a recess (3a) or first recess (3a) on an outer end-face surface, the pressure outlet (8) or first pressure outlet (8) emerges into said recess (3a), and the outlet gasket (14; 44) protrudes into said recess (3a).

Aspect 40. The pump according to the preceding aspect, wherein the outlet gasket (14; 44) is inserted into the recess (3*a*) or first recess (3*a*).

Aspect 41. The pump according to any one of the immediately preceding two aspects, wherein the outlet gasket (14) forms an axial sealing gap which circumferentially surrounds the pressure outlet (8) or first pressure outlet (8) and the recess (3*a*) or first recess (3*a*), in order to seal off the pressure outlet (8) or first pressure outlet (8).

Aspect 42. The pump according to any one of the immediately preceding three aspects, wherein the outlet gasket (44) and an inner circumferential surface of the recess (3*a*) or first recess (3*a*) together form a radial sealing gap which circumferentially surrounds the pressure outlet (8) or first pressure outlet (8), in order to seal off the pressure outlet (8) or first pressure outlet (8).

Aspect 43. The pump according to any one of the immediately preceding four aspects, wherein the first end-face wall (3) of the pump housing (1) has another, second recess (3*b*) on the outer end-face surface, the second pressure outlet (9) emerges into the second recess (3*b*), and the outlet gasket (14; 44) protrudes into the second recess (3*b*) and is preferably inserted into the second recess (3*b*).

Aspect 44. The pump according to the preceding aspect, wherein the outlet gasket (14; 44) is inserted into the second recess (3*b*).

Aspect 45. The pump according to any one of the immediately preceding two aspects, wherein the outlet gasket (14) forms an axial sealing gap which circumferentially surrounds the second pressure outlet (9) and the second recess (3*b*), in order to seal off the second pressure outlet (9).

Aspect 46. The pump according to any one of the immediately preceding three aspects, wherein the outlet gasket (44) and an inner circumferential surface of the second recess (3*b*) together form another radial sealing gap which circumferentially surrounds the second pressure outlet (9), in order to seal off the second pressure outlet (9).

Aspect 47. A pump for supplying an assembly, for example a gearbox, with a pressure fluid, wherein the pump is preferably formed according to any one of the preceding aspects, the pump comprising:
- 47.1 a pump housing (1) comprising a circumferential wall (2), which surrounds a delivery chamber (5) of the pump, a first end-face wall (3) and a second end-face wall (4; 40) which delineate the delivery chamber (5) at its end-face sides;
- 47.2 a rotor (10), which can be rotated about an axis of rotation (R) in the delivery chamber (5), for forming delivery cells which periodically increase and decrease in size as the rotor (10) rotates, in order to deliver pressure fluid from a low-pressure side of the pump to a high-pressure side of the pump;
- 47.3 a pressure outlet (8) which emerges on an outer end-face side of the first end-face wall (3) facing away from the delivery chamber (5) and through which pressure fluid can be discharged from the delivery chamber (5);
- 47.4 an outlet gasket (14; 44) which is provided on the outer end-face side of the first end-face wall (3), for sealing off the pressure outlet (8);
- 47.5 optionally, a fitting structure (20; 40, 41) which serves to attach the pump to an accommodating device (35) and which can be provided in addition to the pump housing (1) or formed by the second end-face wall (40); and
- 47.6 a holder (27) which is in a holding engagement with the outlet gasket (14; 44) and which positions the circumferential wall (3) and the end-face walls (2, 4) and also the fitting structure (20; 40, 41), if it is provided in addition to the second end-face wall (4), relative to each other and axially holds them together as a pre-fitted fitting unit by means of the holding engagement.

Aspect 48. A pump for supplying an assembly, for example a gearbox, with a pressure fluid, wherein the pump is preferably formed according to any one of the preceding aspects, the pump comprising:
- 48.1 a pump housing (1) comprising a circumferential wall (2), which surrounds a delivery chamber (5) of the pump, a first end-face wall (3) and a second end-face wall (4; 40) which delineate the delivery chamber (5) at its end-face sides;
- 48.2 a rotor (10), which can be rotated about an axis of rotation (R) in the delivery chamber (5), for forming delivery cells which periodically increase and decrease in size as the rotor (10) rotates, in order to deliver pressure fluid from a low-pressure side of the pump to a high-pressure side of the pump;
- 48.3 a pressure outlet (8) which emerges on an outer end-face side of the first end-face wall (3) facing away from the delivery chamber (5) and through which pressure fluid can be discharged from the delivery chamber (5);
- 48.4 optionally, an outlet gasket (14; 44) which is provided on the outer end-face side of the first end-face wall (3), for sealing off the pressure outlet (8);
- 48.5 a resistance structure (15) which is provided on the outer end-face side of the first end-face wall (3) immediately downstream of the pressure outlet (8), in order to form a flow resistance for pressure fluid flowing out of the pressure outlet (8), in order to reduce pressure spikes;
- 48.6 optionally, a fitting structure (20; 40, 41) which serves to attach the pump to an accommodating device (35) and which can be provided in addition to the pump housing (1) or formed by the second end-face wall (40); and
- 48.7 a holder (27) which is in a holding engagement with the resistance structure (15) and which positions the circumferential wall (3) and the end-face walls (2, 4) and also the fitting structure (20; 40, 41), if it is provided in addition to the second end-face wall (4), relative to each other and axially holds them together as a pre-fitted fitting unit by means of the holding engagement.

Aspect 49. The pump according to the preceding aspect, wherein the resistance structure (15) is a component part of the outlet gasket (14; 44) and can in particular form the support structure (15) described in any one of Aspects 33 to 35, 77, 104 and 105.

Aspect 50. The pump according to Aspect 48, wherein the resistance structure (15) is provided separately from the outlet gasket (14; 44).

Aspect 51. A pump for supplying an assembly, for example a gearbox, with a pressure fluid, wherein the pump is preferably formed according to any one of the preceding aspects, the pump comprising:
- 51.1 a pump housing (1) comprising a circumferential wall (2), which surrounds a delivery chamber (5) of the pump, a first end-face wall (3) and a second end-face wall (4; 40) which delineate the delivery chamber (5) at its end-face sides;
- 51.2 a rotor (10), which can be rotated about an axis of rotation (R) in the delivery chamber (5), for forming delivery cells which periodically increase and decrease in size as the rotor (10) rotates, in order to deliver pressure fluid from a low-pressure side of the pump to a high-pressure side of the pump;

51.3 a pressure outlet (8) which emerges on an outer end-face side of the first end-face wall (3) facing away from the delivery chamber (5) and through which pressure fluid can be discharged from the delivery chamber (5);

51.4 an outlet gasket (14; 44) which is provided on the outer end-face side of the first end-face wall (3), for sealing off the pressure outlet (8);

51.5 optionally, a fitting structure (20; 40, 41) which serves to attach the pump to an accommodating device (35) and which can be provided in addition to the pump housing (1) or formed by the second end-face wall (40); and 51.6 a holder (27) which is in a holding engagement with the first end-face wall (3) and which positions the circumferential wall (3) and the end-face walls (2, 4) and also the fitting structure (20; 40, 41), if it is provided in addition to the second end-face wall (4), relative to each other and axially holds them together as a pre-fitted fitting unit by means of the holding engagement.

Aspect 52. The pump according to any one of the preceding aspects, wherein the outlet gasket (14; 44) is axially connected to the first end-face wall (3) in a frictional fit by means of a plug connection.

Aspect 53. The pump according to any one of the preceding aspects in combination with any one of Aspects 47, 48 and 51, wherein the holder (27) positions the circumferential wall (3) and the end-face walls (2, 4) and also the fitting structure (20; 40, 41), if it is provided in addition to the second end-face wall (4), relative to each other and axially holds them together in holding engagement with (i) the outlet gasket (14; 44) or (ii) the resistance structure (15) or (iii) the first end-face wall (3) in a loose composite as the pre-fitted fitting unit.

Aspect 54. The pump according to the preceding aspect, wherein the outlet gasket (14') is connected to the first end-face wall (3') in the loose composite by means of the plug connection only.

Aspect 55. The pump according to any one of the preceding aspects in combination with any one of Aspects 47, 48 and 51, wherein the holder (27) protrudes in an axial direction from the fitting structure (20), if it is additionally provided, or the second end-face wall (40) into the holding engagement and is preferably connected, such that it cannot be moved, to the fitting structure (20), if it is additionally provided, or to the second end-face wall (40).

Aspect 56. The pump according to any one of the preceding aspects in combination with any one of Aspects 47, 48 and 51, wherein the holder (27) engages behind the outlet gasket (14; 44) in relation to the axial direction in the holding engagement and so axially holds the fitting unit together.

Aspect 57. The pump according to any one of the preceding aspects in combination with any one of Aspects 47, 48 and 51, wherein the outlet gasket (14; 44) has an axial passage (15*c*), and the holder (27) protrudes at least into the passage (15*c*) and engages behind the outlet gasket (14; 44) in relation to the axial direction, axially immediately behind the passage (15*c*) or in the passage (15*c*) in the holding engagement.

Aspect 58. The pump according to any one of the preceding aspects in combination with any one of Aspects 47, 48 and 51, wherein the holder (27) engages behind the outlet gasket (14; 44) in relation to the axial direction from the side, namely an outer circumference and/or an inner circumference of the outlet gasket (14; 44), in the holding engagement.

Aspect 59. The pump according to any one of the preceding aspects in combination with any one of Aspects 47, 48 and 51, wherein an engaging element (15*d*; 16*d*) of the outlet gasket (14; 44) and a complementary engaging element (29) of the holder (27) are in the holding engagement.

Aspect 60. The pump according to the preceding aspect, wherein the engaging element (15*d*; 16*d*) engages behind the complementary engaging element (29) in relation to the axial direction in the holding engagement.

Aspect 61. The pump according to any one of the immediately preceding two aspects, wherein the engaging element (15*d*; 16*d*) forms a barb for the complementary engaging element (29) in the holding engagement.

Aspect 62. The pump according to any one of the immediately preceding three aspects, wherein the engaging element (15*d*; 16*d*) and/or the complementary engaging element (29) is/are flexible in a radial direction against an elastic restoring force, such that the respective elastic restoring force causes the engaging element (15*d*; 16*d*) and/or the complementary engaging element (29) to radially yield and then automatically snap forwards or widen radially into the holding engagement, when the holding engagement is established.

Aspect 63. The pump according to the preceding aspect, wherein the engaging element (15*d*; 16*d*) of the outlet gasket (14; 44) is flexible in a radial direction against an elastic restoring force.

Aspect 64. The pump according to any one of the immediately preceding two aspects, wherein the complementary engaging element of the holder is flexible in a radial direction against an elastic restoring force.

Aspect 65. The pump according to any one of the preceding aspects in combination with any one of Aspects 47, 48 and 51, wherein an engaging element (15*d*; 16*d*) of the outlet gasket (14; 44) and a complementary engaging element (29) of the holder (27) are in holding engagement, and the holder (27) has the complementary engaging element (29) in the form of a radial projection or a circumferential radial widening (29) in an axial end portion which comprises a free axial end of the holder (27).

Aspect 66. The pump according to any one of the preceding aspects, wherein the holder (27) is elongated in an axial direction, preferably in the shape of a pin or rod, has a free axial end and is in holding engagement at the free end or axially near the free end.

Aspect 67. The pump according to any one of the preceding aspects in combination with any one of Aspects 47, 48 and 51, wherein in addition to the holding engagement, the outlet gasket (14; 44) is held on the first end-face wall (3) in a frictional fit, preferably by means of an axial plug connection between the outlet gasket (14; 44) and the first end-face wall (3).

Aspect 68. The pump according to the preceding aspect, wherein the holder (27) is axially short of an outer end-face surface of the outlet gasket (14; 44) facing axially away from the pump housing (1).

Aspect 69. The pump according to any one of the preceding aspects in combination with any one of Aspects 47, 48 and 51, wherein the holding engagement consists of a frictional fit connection and/or a positive fit connection.

Aspect 70. The pump according to any one of the preceding aspects in combination with any one of Aspects 47, 48 and 51, wherein the holder (27) holds the circumferential wall (2) and the first end-face wall (3), pointing downwards and suspended against gravity, in holding engagement with the outlet gasket (14; 44) on the second end-face wall (40) or holds the pump housing (1), pointing downwards and suspended against gravity, in holding engagement with the outlet gasket (14; 44) on the fitting structure (20), if it is additionally provided, in order to facilitate positioning the pump housing (1) on the accommodating device (35).

Aspect 71. The pump according to any one of the preceding aspects in combination with any one of Aspects 47, 48 and 51, wherein the holder (27) extends axially through the circumferential wall (2) of the pump housing (1) and optionally through the first end-face wall (3) and/or the second end-face wall (4) of the pump housing (1).

Aspect 72. The pump according to any one of the preceding aspects in combination with any one of Aspects 47, 48 and 51, wherein the holder (27) positions the circumferential wall (2) and the end-face walls (3, 4), and optionally the outlet gasket (14; 44), relative to each other in relation to the circumferential direction.

Aspect 73. The pump according to any one of the preceding aspects in combination with any one of Aspects 47, 48 and 51, wherein another holder (27) corresponding to the holder (27) according to any one of the preceding aspects is provided and is in another holding engagement with the outlet gasket (14; 44), wherein the holders (27) position the circumferential wall (3) and the end-face walls (2, 4) and also the fitting structure (20; 40, 41), if it is provided in addition to the second end-face wall (4), relative to each other and axially hold them together in a loose composite as the pre-fitted fitting unit by means of the respective holding engagement.

Aspect 74. The pump according to any one of the preceding aspects in combination with any one of Aspects 47, 48 and 51, wherein the circumferential wall (2) and/or the first end-face wall (3) and/or the outlet gasket (14; 44) is/are axially guided by the holder (27).

Aspect 75. The pump according to any one of the preceding aspects in combination with any one of Aspects 47, 48 and 51, wherein the fitting structure (20; 40, 41) is axially fixed on an accommodating device (35), preferably an accommodating device (35) of an assembly which is to be supplied with the pressure fluid, and the outlet gasket (14; 44) is pressed against an axially facing attaching wall (37) of the accommodating device (35) into an axial sealing contact with the attaching wall (37).

Aspect 76. The pump according to any one of the preceding aspects in combination with any one of Aspects 47, 48 and 51, wherein the outlet gasket (14; 44) comprises a support structure (15) made of a support material, preferably a three-dimensionally curved, thin support structure (15), and a gasket structure (16) which is connected to the support structure (15) and made of a gasket material, for example a rubber material or elastomer material, for sealing off the pressure outlet (8), and the support structure (15) and/or the gasket structure (16) is in holding engagement with the holder (27).

Aspect 77. The pump according to any one of the preceding aspects, wherein the outlet gasket (14; 44) has a gasket structure (16) made of a gasket material, for sealing off a first pressure outlet (8) and an optional second pressure outlet (9) of the pump, the gasket structure (16) comprising:

77.1 a first sealing stay (18) which circumferentially encloses a first fluid passage (18a) of the outlet gasket (14; 44), provided for the first pressure outlet (8), in a seal in an axial plan view onto the outlet gasket;

77.2 optionally, a second sealing stay (19) which circumferentially encloses a second fluid passage (19a) of the outlet gasket (14; 44), optionally located laterally next to the first fluid passage (18a), in a seal in the plan view; and 77.3 a support structure (15) which is fixedly connected to the gasket structure (16) and extends into the first fluid passage (18a) in the plan view, in order to form a flow resistance for pressure fluid flowing through the first fluid passage (18a) in the region of the first fluid passage (18a), 77.4 wherein the holder (27) and, if provided, also the other holder in accordance with Aspect 73 is/are in respective holding engagement with the support structure (15) and/or the gasket structure (16).

Aspect 78. The pump according to any one of the preceding aspects, wherein the pump housing (1) is held, such that it can be axially moved, in holding engagement on the fitting structure (20) and/or the outlet gasket (44) is held, such that it can be axially moved, in holding engagement on the pump housing (1).

Aspect 79. The pump according to any one of the preceding aspects, wherein the pump housing (1) and the outlet gasket (14; 44) are pre-fitted in position with respect to each other in the fitting unit.

Aspect 80. The pump according to the preceding aspect, wherein the second end-face wall (4) of the pump housing (1) forms the fitting structure (40, 41) or the fitting structure (20) is additionally provided and pre-fitted in position with respect to the pump housing (1) in the fitting unit.

Aspect 81. The pump according to any one of the preceding aspects, wherein the outlet gasket (14; 44), when pre-fitted, is axially secured in a particular position relative to the pump housing (1) and preferably held in a positive fit and/or frictional fit.

Aspect 82. The pump according to any one of the preceding aspects in combination with any one of Aspects 47, 48 and 51, wherein the holder (27) axially extends through the first end-face wall (3) of the pump housing (1).

Aspect 83. The pump according to any one of the preceding aspects in combination with any one of Aspects 47, 48 and 51, wherein the holder (27) axially extends through the second end-face wall (4) of the pump housing (1).

Aspect 84. The pump according to any one of the preceding aspects in combination with any one of Aspects 47, 48 and 51, wherein the holder (27) axially extends through the circumferential wall (2) of the pump housing (1).

Aspect 85. The pump according to any one of the preceding aspects in combination with any one of Aspects 47, 48 and 51, wherein the holder (27) axially guides the pump housing (1) such that it can be moved.

Aspect 86. The pump according to any one of the preceding aspects, wherein the circumferential wall (2), the first end-face wall (3) and the second end-face wall (4) of the pump housing (1) are produced separately from each other and arranged axially next to each other as a pre-fitted unit and preferably lie directly on each other in a loose axial end-face side contact.

Aspect 87. The pump according to any one of the preceding aspects in combination with Aspect 10, wherein the first end-face wall (3) of the pump housing (1) and/or the second end-face wall (4) of the pump housing (1) can be axially moved relative to the circumferential wall (2), against the force of the pressing device (30).

Aspect 88. The pump according to any one of the preceding aspects, wherein the first end-face wall (3) of the pump housing (1) is loosely pressed against a first end-face surface of the circumferential wall (2), and/or the second end-face wall (4) of the pump housing (1) is loosely pressed against a second end-face surface of the circumferential wall (2).

Aspect 89. The pump according to any one of the preceding aspects, wherein the first end-face wall (3) of the pump housing (1) and/or the second end-face wall (4) of the pump housing (1) and/or an end-face wall (21) of the fitting structure (20) mounts or jointly mount the rotor (10) such that it can rotate about the axis of rotation (R).

Aspect 90. The pump according to any one of the preceding aspects, wherein the fitting structure (20) surrounds the second end-face wall (4) of the pump housing (1) in a seal, forming a radial sealing gap.

Aspect 91. The pump according to any one of the preceding aspects, wherein the fitting structure (20) comprises one or more fastening elements (29) for fastening the pump to an accommodating device (35).

Aspect 92. The pump according to any one of the preceding aspects, wherein the fitting structure (20; 40, 41) is axially fixed on an accommodating device (35), preferably an accommodating device (35) of an assembly which is to be supplied with the pressure fluid, and the pressing device (30; 45) presses the outlet gasket (14; 44) against an axially facing attaching wall (37) of the accommodating device (35).

Aspect 93. The pump according to the preceding aspect in combination with Aspect 10, wherein the pressing device (30) presses the pump housing (1), with the outlet gasket (14) first, towards the attaching wall (37) and thus presses the outlet gasket (14) against the attaching wall (37).

Aspect 94. The pump according to any one of the immediately preceding two aspects, wherein the outlet gasket (14; 44) acts as an axial gasket in relation to the attaching wall (37).

Aspect 95. The pump according to any one of the immediately preceding three aspects, wherein the pump housing (1) protrudes axially from the fitting structure (20) into an accommodating well (36) of the accommodating device (35).

Aspect 96. The pump according to any one of the immediately preceding four aspects, wherein the accommodating device (35) has a pressure channel which emerges on the attaching wall (37) in order to form a pressure port (38) for the pressure outlet (8), and wherein the outlet gasket (14; 44) surrounds the pressure outlet (8) of the pump housing (1) and the pressure port (38) of the accommodating device (35) in a seal.

Aspect 97. The pump according to the preceding aspect in combination with Aspect 26, wherein the accommodating device (35) has another pressure channel which emerges on the attaching wall (37) in order to form a pressure port (39) for the second pressure outlet (9), and wherein the outlet gasket (14; 44) surrounds the second pressure outlet (9) of the pump housing (1) and the pressure port (39) of the accommodating device (35) in a seal.

Aspect 98. The pump according to any one of the preceding aspects, wherein the pump is a vane cell pump and comprises one or more vanes (11) which are coupled to the rotor (10) for rotational slaving in order to form the delivery cells.

Aspect 99. The pump according to any one of the preceding aspects, wherein the pump is used as a gear pump for supplying a gearbox with the pressure fluid as a working fluid and/or lubricant.

Aspect 100. The pump according to any one of the preceding aspects, wherein the pump is driven by a drive motor of a vehicle or by an electric motor provided in addition to the drive motor of the vehicle and serves to supply the drive motor and/or a gearbox of the vehicle with the pressure fluid as a working fluid and/or lubricant.

Aspect 101. The pump according to any one of the preceding aspects, wherein the pump is driven by a shaft of a device for generating electrical energy and serves to supply a gearbox of the device with the pressure fluid as a working fluid and/or lubricant.

Aspect 102. The pump according to any one of the preceding aspects, wherein a relief channel (5*a*) which emerges on an outer surface of the first end-face wall (3), preferably on the outer end-face surface of the first end-face wall (3), connects the low-pressure side of the delivery chamber (5) to the outer environment of the pump housing (1).

Aspect 103. The pump according to the preceding aspect, wherein the relief channel (5*a*) emerges on the outer end-face surface of the first end-face wall (3) next to the sealing stay (18), preferably between the first sealing stay (18) and the second sealing stay (19) in an axial plan view if the pump is embodied as a multi-flux pump.

Aspect 104. An outlet gasket which has a gasket structure (16) made of a gasket material, for sealing off a first pressure outlet (8) and a second pressure outlet (9) of a pump and separating the first pressure outlet (8) from the second pressure outlet (9), the gasket structure (16) comprising:
  a first sealing stay (18) which circumferentially encloses a first fluid passage (18*a*) of the outlet gasket (14; 44), provided for the first pressure outlet (8), in a seal in an axial plan view onto the outlet gasket; and
  a second sealing stay (19) which circumferentially encloses a second fluid passage (19*a*) of the outlet gasket (14; 44), provided for the second pressure outlet (9) and located laterally next to the first fluid passage (18*a*), in a seal in the plan view,
  wherein the gasket structure (16) forms the sealing stays (18, 19) contiguously as a unit, and/or the outlet gasket (14; 44) comprises a support structure (15) on which the sealing stays (18, 19) are arranged.

Aspect 105. An outlet gasket which has a gasket structure (16) made of a gasket material, for sealing off a first pressure outlet (8) and an optional second pressure outlet (9) of a pump, the gasket structure (16) comprising:
  a first sealing stay (18) which circumferentially encloses a first fluid passage (18*a*) of the outlet gasket (14; 44), provided for the first pressure outlet (8), in a seal in an axial plan view onto the outlet gasket;
  optionally, a second sealing stay (19) which circumferentially encloses a second fluid passage (19*a*) of the outlet gasket (14; 44), optionally located laterally next to the first fluid passage (18*a*), in a seal in the plan view; and
  a support structure (15) which is fixedly connected to the gasket structure (16) and extends into the first fluid passage (18*a*) in the plan view, in order to form a flow resistance for pressure fluid flowing through the first fluid passage (18*a*) in the region of the first fluid passage (18*a*).

Aspect 106. The outlet gasket according to the preceding aspect, wherein the first sealing stay (18) and the second sealing stay (19) are each D-shaped in the plan view, each have a flat stay portion and a stay portion which bulges out from the flat stay portion, and face each other via their flat stay portions, wherein the flat stay portions can form a common sealing stay portion (17) over at least some of their extent.

Aspect 107. The outlet gasket according to any one of the preceding aspects, wherein the first sealing stay (18) and the second sealing stay (19) have a common sealing stay portion (17).

Aspect 108. The outlet gasket according to any one of the immediately preceding two aspects, wherein the common sealing stay portion (17) extends, in the plan view, from a peripheral portion end towards a central region of the outlet gasket (14; 44) up to a central portion end.

Aspect 109. The outlet gasket according to the preceding aspect, wherein the first sealing stay (18) and the second sealing stay (19) converge at the central portion end of the common sealing stay portion (17), enclosing the respective fluid passage (18a, 19a).

Aspect 110. The outlet gasket according to any one of the immediately preceding two aspects, wherein the sealing stays (18, 19) diverge, in the plan view, at the peripheral portion end of the common sealing stay portion (17).

Aspect 111. The outlet gasket according to any one of the immediately preceding five aspects, wherein the flat sealing stay portions or the common sealing stay portion (17) extend(s) between the first fluid passage (18a) and the second fluid passage (19a).

Aspect 112. The outlet gasket according to any one of the immediately preceding six aspects, wherein the first sealing stay (18) and the second sealing stay (19) extend together in the shape of a B in the plan view.

Aspect 113. The outlet gasket according to any one of the immediately preceding seven aspects, wherein the first sealing stay (18) and the second sealing stay (19) extend, in the plan view, at a distance next to each other towards the periphery of the outlet gasket (14; 44), forming a passage (17a) remaining between the sealing stays (18, 19).

Aspect 114. The outlet gasket according to the preceding aspect, wherein the first sealing stay (18) and the second sealing stay (19) extend, in the plan view, from the central portion end at a distance next to each other, pointing away from the peripheral portion end of the common sealing stay portion (17), towards the periphery of the outlet gasket (14; 44), forming the passage (17a).

Aspect 115. The outlet gasket according to any one of the immediately preceding two aspects, wherein the passage (17a) is free of gasket material up to the periphery of the outlet gasket (14; 44) and open at the periphery or closed by the gasket structure (16).

Aspect 116. The outlet gasket according to any one of the immediately preceding three aspects, wherein a longitudinal direction of the passage (17a) points from the central region of the outlet gasket (14; 44) towards the periphery, and the passage (17a) has a width, as measured transversely to the longitudinal direction, which is smaller than a maximum width of the first fluid passage (18a) and smaller than a maximum width of the second fluid passage (19a).

Aspect 117. The outlet gasket according to any one of the preceding aspects, wherein the gasket structure (16) is fixedly connected to the support structure (15), and the support structure (15) extends, in the plan view, into the first fluid passage (18a) and/or into the second fluid passage (19a) in order to form a flow resistance in the region of the respective fluid passage (18a, 19a) for pressure fluid flowing through the respective fluid passage (18a, 19a).

Aspect 118. The outlet gasket according to the preceding aspect, wherein the support structure (15) has a first bulge (15b) and optionally a second bulge (15b) situated laterally next to the first bulge (15b) in the plan view, and a surface region of the first bulge (15b) which is axially offset with respect to the first sealing stay (18) extends into the first fluid passage (18a) in the plan view, and wherein a surface region of the second bulge (15b), if provided, which is axially offset with respect to the second sealing stay (19) extends into the second fluid passage (19a) in the plan view.

Aspect 119. The outlet gasket according to any one of the preceding aspects, further comprising a third sealing stay (16a) which, in the plan view, circumferentially encloses a region of the outlet gasket (14), preferably a central region of the outlet gasket (14), located between the first fluid passage (18a) and the second fluid passage (19a), in a seal.

Aspect 120. The outlet gasket according to the preceding aspect in combination with Aspect 113, wherein the third sealing stay (16a) comprises a portion of the first sealing stay (18) and a portion of the second sealing stay (19) and circumferentially encloses the passage (17a) remaining between the first sealing stay (18) and the second sealing stay (19) in a seal, in the plan view.

Aspect 121. The outlet gasket according to any one of the preceding aspects, wherein in the plan view, the support structure (15) completely or at least mostly fills the cross-sectional area of the respective fluid passage (18a, 19a) and has one or more passages (15e), each preferably in the manner of a hole, which are narrower than the cross-sectional area of the respective fluid passage (18a, 19a), in order to form the flow resistance as a perforated shutter or in the manner of a perforated shutter.

Aspect 122. The outlet gasket according to any one of the preceding aspects, wherein the gasket material is injection-moulded onto the support structure (15) in the form of the gasket structure (16) in an injection-moulding method, or the gasket material is injection-moulded around the support structure (15) in the form of the gasket structure (16) in an injection-moulding method.

Aspect 123. The outlet gasket according to any one of the preceding aspects, wherein the gasket material is a rubber material or elastomer material, preferably a thermoplastic elastomer (TPE).

Aspect 124. The outlet gasket according to any one of the preceding aspects, wherein the support structure (15) consists of a support material which has a greater strength and/or hardness and/or modulus of elasticity than the gasket material.

Aspect 125. The outlet gasket according to any one of the preceding aspects, wherein:
the outlet gasket (14; 44), preferably the support structure (15), has a first flange (15a) and a first bulge (15b) projecting axially from the first flange (15a);
the first flange (15a) extends around the first bulge (15b) and the first fluid passage (18a); and
the first sealing stay (18) extends along the end-face side of the first flange (15a) facing axially away from the first bulge (15b), and preferably along the other end-face side of the first flange (15a), and is fixedly connected to the first flange (15a).

Aspect 126. The outlet gasket according to any one of the preceding aspects, wherein:
the outlet gasket (14; 44), preferably the support structure (15), has a first flange (15a) and a first bulge (15b) projecting from the first flange (15a);
the first flange (15a) extends around the first bulge (15b) and the first fluid passage (18a); and
the outlet gasket (14; 44) comprises a first circumferential region (18'; 48), made of the gasket material, which extends along an outer circumference of the first bulge (15b) and is fixedly connected to the outer circumference of the first bulge (15b), in order to form a plug connection and/or a first radial sealing stay (48) with a pump housing (1) when the outlet gasket (44) is arranged on the pump housing (1).

Aspect 127. The outlet gasket according to any one of the preceding aspects, wherein:

the outlet gasket (14; 44), preferably the support structure (15), has a second flange (15a) and a second bulge (15b) projecting from the second flange (15a);

the second flange (15a) extends around the second bulge (15b) and the second fluid passage (19a); and the second sealing stay (19) extends along the end-face side of the second flange (15a) facing axially away from the second bulge (15b), and preferably along the other end-face side of the second flange (15a), and is fixedly connected to the second flange (15a).

Aspect 128. The outlet gasket according to any one of the preceding aspects, wherein:

the outlet gasket (14; 44), preferably the support structure (15), has a second flange (15a) and a second bulge (15b) projecting from the second flange (15a);

the second flange (15a) extends around the second bulge (15b) and the second fluid passage (19a); and the outlet gasket (14; 44) comprises a second circumferential region (19'; 49), made of the gasket material, which extends along an outer circumference of the second bulge (15b) and is fixedly connected to the outer circumference of the second bulge (15b), in order to form a plug connection and/or a second radial sealing stay (49) with a pump housing (1) when the outlet gasket (44) is arranged on the pump housing (1).

Aspect 129. The outlet gasket according to any one of Aspects 104 to 124, wherein the support structure (15') is shaped as a cover or disc.

Aspect 130. The outlet gasket according to any one of the preceding aspects, wherein an outer circumference of the gasket structure (16') has a radial sealing stay (16"), for forming a radial gasket on an outer circumference of a pump housing (1) of the pump.

Aspect 131. The outlet gasket according to any one of the preceding aspects in combination with a pressing device (45; 46; 47) which acts as a spring and is shaped, at least in portions, to follow the profile of the first sealing stay (18) and/or the profile of the second sealing stay (19) in order to support the outlet gasket (44) spring-elastically on a pump housing (1) of the pump.

Aspect 132. The outlet gasket according to the preceding aspect, wherein the pressing device (45; 46; 47) is formed as a pressing ring (45) or comprises a pressing ring (46a; 47a), and the pressing ring (45; 46a; 47a) can be axially placed onto the outlet gasket (44) and, once placed on it, follows the profile of the first sealing stay (18) and, if provided, also the profile of the second sealing stay (19), at least in sections, and covers the respective sealing stay (18, 19), in the plan view.

Aspect 133. The outlet gasket according to any one of the immediately preceding two aspects, wherein the pressing device (45; 46; 47) can axially placed onto the first sealing stay (18) and, if provided, also onto the second sealing stay (19) and, once placed on it/them, has a spring axis pointing orthogonally with respect to the respective sealing stay (18, 19).

Aspect 134. The outlet gasket according to any one of the immediately preceding three aspects, wherein the pressing device (45; 46) has one or more support points for axially supporting the pressing device, axially flush with the first sealing stay (18) and, if provided, also with the second sealing stay (19), on a rear side facing axially away from the respective sealing stay (18, 19).

Aspect 135. The outlet gasket according to any one of the preceding aspects, wherein the outlet gasket (14; 44) has one or more passages (15c), each comprising one or more engaging elements (15d) protruding into the respective passage (15c), in the plan view, in order to engage a securing element (27) when one protrudes through the respective passage (15c).

Aspect 136. The outlet gasket according to any one of the preceding aspects, wherein the support structure (15) is a three-dimensionally curved, thin shell structure made of a metal or plastic material.

Aspect 137. The outlet gasket according to any one of the preceding aspects, wherein the support structure (15) is a sheet-shaped metal or plastic structure and can in particular be a metal sheet or organic sheet.

Aspect 138. The outlet gasket according to any one of Aspects 104 to 137, used as the outlet gasket (14; 44) of the pump according to any one of Aspects 1 to 103.

BRIEF DESCRIPTION OF THE DRAWINGS

The invention is explained below on the basis of example embodiments. Features disclosed by the respective example embodiment, each individually and in any combination of features, advantageously develop the subject-matter of the claims, the subject-matter of the aspects and the embodiments explained above. One or more features which is/are disclosed by one of the example embodiments can (each) be combined with one or more features disclosed by another of the example embodiments, provided the features of the different example embodiments are not mutually exclusive. There is shown:

DETAILED DESCRIPTION OF THE INVENTION

Figure 1:
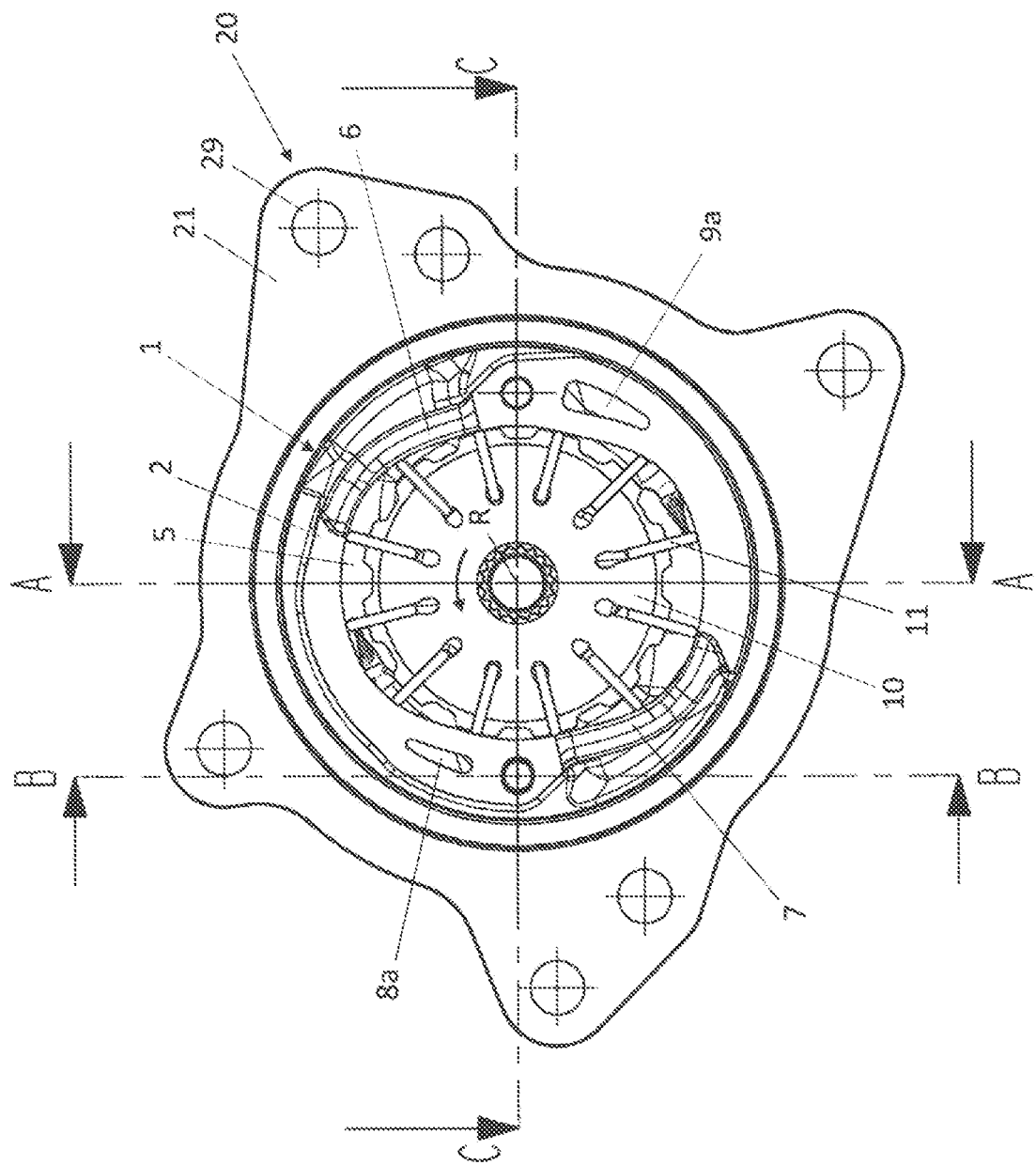
FIG. 1 a pump of a first example embodiment in an axial view onto a delivery chamber of the pump.

FIG. 1 shows a pump of a first example embodiment in an axial view onto a pump housing 1. A delivery chamber 5 is formed in the pump housing 1. The pump housing 1 comprises a circumferential wall 2, which surrounds the delivery chamber 5, and end-face walls which axially delineate the delivery chamber 5 on both end-face sides. One of the end-face walls has been removed in FIG. 1, such that there is a clear view into the delivery chamber 5.

The pump is embodied as a rotary pump and comprises a rotor 10, which can be rotated about an axis of rotation R in the delivery chamber 5, and a plurality of vanes 11 which are guided in slots of the rotor 10 such that they can be moved radially or at least substantially in a radial direction, as is usual in vane cell pumps. The circumferential wall 2 forms a guide surface for the vanes 11. When the rotor 10 rotates, the vanes 11 are pressed against the guide surface of the circumferential wall 2. When the rotor 10 is rotating, the guide surface determines how far the vanes 11 protrude beyond the outer circumference of the rotor 10. The vanes 11 delineate delivery cells, formed in the delivery chamber 5, in the circumferential direction. The profile of the guide surface of the circumferential wall 2 is chosen such that the delivery cells periodically increase in size on a low-pressure side of the delivery chamber 5 and decrease again in size on a high-pressure side of the delivery chamber 5 when the rotor 10 rotates, in order to expel a fluid, which flows into the delivery chamber 5 through an inlet on the low-pressure side of the delivery chamber 5, through a pressure outlet situated on the high-pressure side of the delivery chamber 5 at an increased pressure as a pressure fluid. In advantageous embodiments, the pump is configured to suction the fluid through the inlet, for example against gravity.

The pump comprises another component in the form of a fitting structure 20 which is loosely joined to the pump housing 1 when pre-fitted, in order to form the pump as a pre-fitted fitting unit. The fitting structure 20 serves to fix the pump to an accommodating device, i.e. at the installation location. For the purpose of fixing, the fitting structure 20 has a flange 21 which protrudes radially beyond the pump housing 1 and which is provided with fastening elements 29 which serve to fasten it to the accommodating device. As in the example embodiment, the fastening elements 29 can be passages, such as for example simple drilled holes, for fastening means such as for example fastening screws.

The pump is a multi-flux pump—in the example embodiment, a dual-flux pump—i.e. it has a first working flux and a second working flux. The delivery chamber 5 accordingly has a first inlet 6 and a first pressure outlet at 8 (FIG. 2) for the first working flux and a second inlet 7 and a second pressure outlet at 9 (FIG. 2) for the second working flux. When the pump is in operation, the rotor 10 rotates anti-clockwise in FIG. 1, as indicated by a directional arrow of rotation. A first passage which extends axially through the circumferential wall 2 on the high-pressure side of the first working flux is denoted by 8a, and a second passage which extends axially through the circumferential wall 2 on the high-pressure side of the second working flux is denoted by 9a. The pressure passages 8a and 9a are each connected to associated pressure outlets of the first end-face wall 3, as will be explained below on the basis of FIG. 2.

Figure 2:
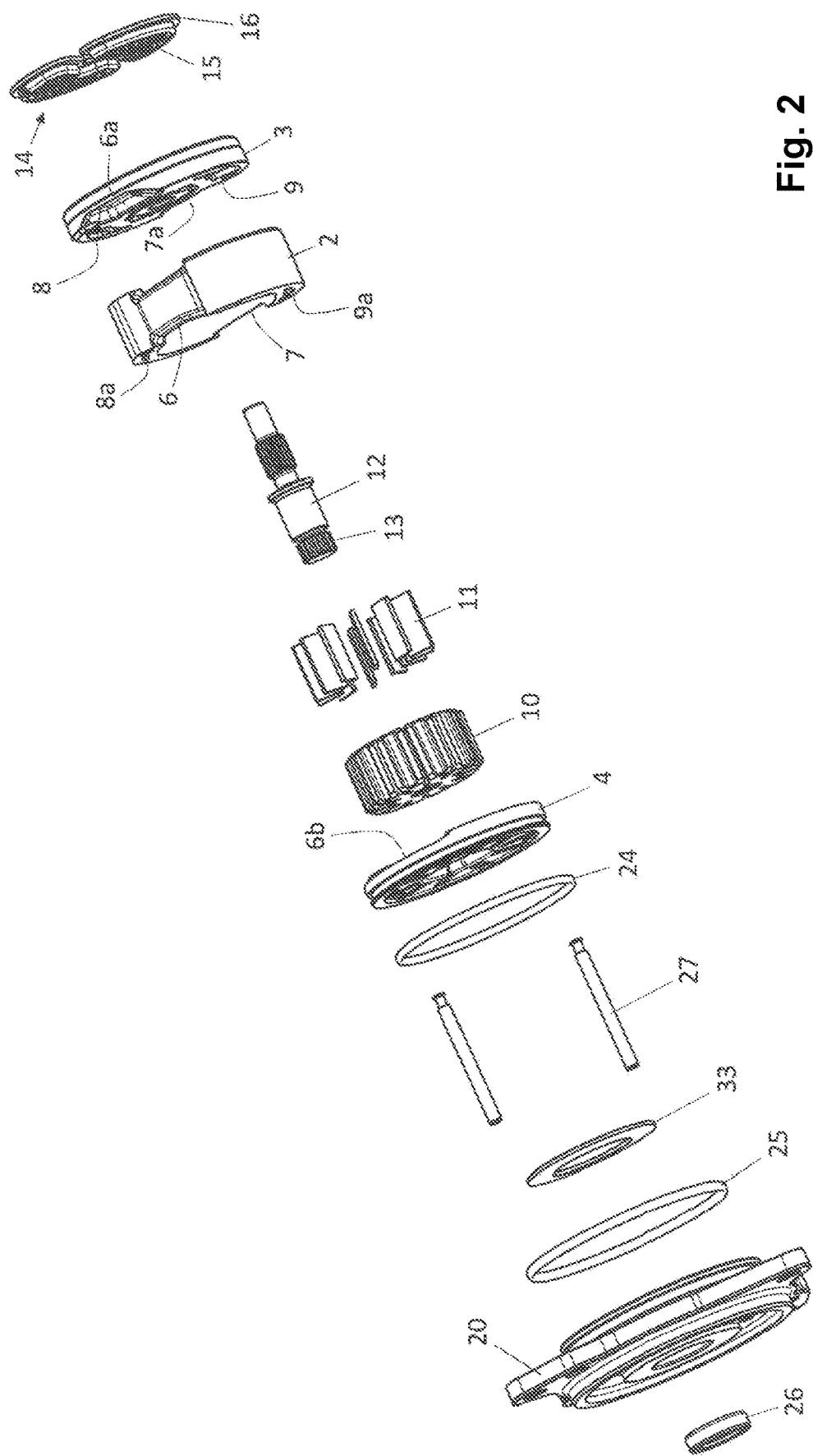
FIG. 2 components of the pump in a perspective view, lined up along an axis of rotation of the pump.

FIG. 2 shows the separately produced components of the pump in a perspective view along the axis of rotation R (FIG. 1), lined up one behind the other and relative to each other, for assembling the pump. The circumferential wall 2 forms a closed ring, while the end-face walls 3 and 4 are plate-shaped. In a first angular region, over which the low-pressure side of the first working flux extends, the circumferential wall 2 has a cavity on each of the two end-face sides in order to form the first inlet 6. In another angular range, over which the low-pressure side of the second working flux extends, the circumferential wall 2 also has a second cavity on each of the two end-face sides in order to form the second inlet 7. The fluid can flow into the delivery chamber 5 (FIG. 1) via the end-facing cavities, i.e. via the first inlet 6 and the second inlet 7. In the angular range of the inlet 6 and the inlet 7, the outer circumference of the circumferential wall 2 also has cavities which respectively extend axially from one end-facing cavity to the axially opposite other end-facing cavity. The cavities on the circumference connect the two end-facing cavities of the first inlet 6 and, on the opposite side, the two end-facing cavities of the second inlet 7, such that a comparatively large-volumed first inlet 6 and a similarly large-volumed second inlet 7 are obtained. The end-face walls 3 and 4 are each provided with associated cavities 6a and 6b in order to increase the flow cross-section of the inlet 6. The arrangements are the same in relation to the second inlet 7, wherein only the cavity 7a of the first end-face wall 3 can be seen in FIG. 2 and the corresponding cavity at the second end-face wall 4 is hidden.

A first pressure outlet 8 extends through the first end-face wall 3 in an angular region over which the high-pressure side of the first working flux extends, and a second pressure outlet 9 extends through the first end-face wall 3 in an angular region over which the high-pressure side of the second working flux extends. The second end-face wall 4 has a first cavity axially opposite the first pressure outlet 8 and a second cavity axially opposite the second pressure outlet 9. When assembled, the first cavity is connected to the first pressure outlet 8 via the first passage 8a of the circumferential wall 2, and the second recess is connected to the second pressure outlet 9 via the second passage 9a. When the pump is in operation, the pressure fluid is thus also displaced on the end-face side of the delivery chamber 5, on which the second end-face wall 5 is arranged, whence it passes through the two passages 8a and 9a of the circumferential wall 2 into the pressure outlet 8 or 9 of the relevant working flux and is discharged via the relevant pressure outlet 8 or 9. In the following, reference is always additionally made to FIG. 2, even without this being explicitly mentioned.

The first pressure outlet 8 and the second pressure outlet 9 are sealed off from each other and from the low-pressure side of the pump on the outer end-face side of the first end-face wall 3 facing axially away from the circumferential wall 2 by means of an outlet gasket 14. The outlet gasket 14 is provided as a gasket unit. It comprises a support structure 15 made of a support material and a gasket structure 16 made of a gasket material which in advantageous embodiments is more flexible than the support material. The support structure serves as a support for the gasket material, i.e. it stabilises the gasket material and also serves to correctly position the gasket material relative to the pump housing 1.

The support material can be a metal, for example an alloy and in particular steel, or a plastic material, including a plastic composite material. The gasket material can be flexible, such that it can perform a sealing function when it is in pressing contact with a complementary surface. The gasket material can in particular be an elastomer material or for example also rubber. In order to perform the sealing function, it can be dimensionally elastic and/or preferably materially elastic, i.e. elastically compressible in its own right. In principle, however, a plastically flexible gasket material could also be used. The gasket material is preferably a thermoplastic elastomer (TPE).

Figure 3:
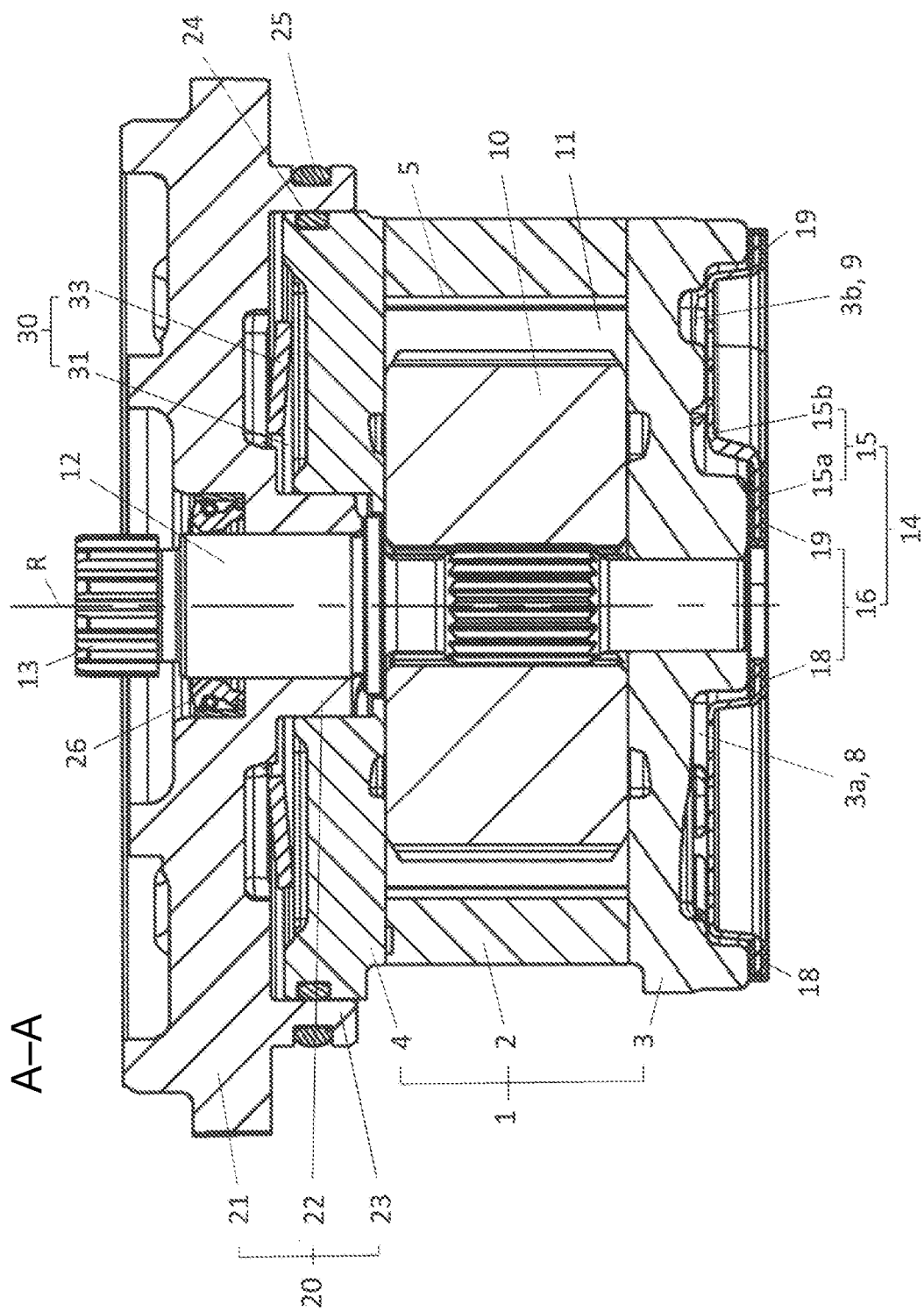
FIG. 3 the longitudinal section A-A of FIG. 1.

FIG. 3 shows the pump of the first example embodiment, pre-fitted, in the longitudinal section A-A of FIG. 1. The pump housing 1 comprises the wall structures already mentioned, namely the circumferential wall 2, the first end-face wall 3 and the second end-face wall 4, which together delineate the delivery chamber 5 over its circumference and axially on its end-face sides. The end-face walls 3 and 4 each rest against the circumferential wall 2 in an axial contact. The circumferential wall 2 can be joined to the end-face walls 3 and 4, in particular loosely, i.e. not in a material fit.

The rotor 10 is non-rotationally connected to a drive shaft 12. The drive shaft 12 extends through the end-face walls 3 and 4 and also through the fitting structure 20. In an axial portion of the drive shaft 12 which protrudes out of the fitting structure 20, a drive wheel 13 is arranged such that it cannot be rotated relative to the drive shaft 12. In the example embodiment, the drive wheel 13 forms an axial end of the drive shaft 12. The drive wheel 13 is a drive wheel for a belt drive of the drive shaft 12 and, together with it, the rotor 10. Alternatively, the drive wheel 13 can also be a chain wheel for a chain drive or a gear wheel for a gear drive of the drive shaft 12. The shaft passage of the fitting structure 20 is sealed off by means of a shaft gasket 26.

The pump housing 1 can be moved axially, i.e. parallel to the axis of rotation R, back and forth relative to the fitting structure 20 and is linearly guided by the fitting structure 20 within the context of its about to relatively move axially. For the purpose of being able to move axially, the pump housing 1 and the fitting structure 20 are in an axial guide engagement in the region of the second end-face wall 4. The fitting structure 20 and the end-face wall 4 form a prismatic joint, advantageously with a sliding guide engagement and the degree of freedom of axial translation. The ability to move axially serves to compensate for component and/or installation tolerances and/or temperature-induced changes in geometry and/or axial movements which can arise from changes in delivery pressure. In order for the rotor 10 to be able to follow axial compensation movements, the rotor 10 can be able to move axially relative to the drive shaft 12 in a rotational blocking engagement with the drive shaft 12 and/or the drive shaft 12 can be able to move axially relative to the fitting structure 20. The first end-face wall 3 and/or the second end-face wall 4 can be able to move axially relative to the drive shaft 12.

The fitting structure 20 has an end-face wall 21 which forms the flange already mentioned, in a region which protrudes radially beyond the pump housing 1, for fixing the pump at the installation location. An inner collar 22 and an outer collar 23 protrude axially from the end-face wall 21. The outer collar 23 circumferentially surrounds the pump housing 1 completely, i.e. over 360°, around the axis of rotation R in the region of the second end-face wall 4. The inner collar 22 surrounds the drive shaft 12. It forms a shaft socket. Advantageously, the inner collar 22 also circumferentially extends completely, i.e. over 360°, around the axis of rotation R.

The inner collar 22 and the outer collar 23 delineate a recess of the fitting structure 20 which is open towards the pump housing 1. The pump housing 1 protrudes into this annular recess in the region of the second end-face wall 4 and is shaped to conform to this recess in order to form the prismatic joint. The pump housing 1 can be axially guided on the inner collar 22 and/or the outer collar 23.

In order to ensure that the pressure outlets 8 and 9 are sealed off from the low-pressure side of the pump and also from each other despite any tolerances and/or changes in the geometry of the accommodating device on which the pump is arranged and/or components of the pump, the pump comprises a pressing device 30. The pressing device 30 serves to generate an axial pressing force with which the outlet gasket 14 is pressed against an attaching wall of the accommodating device which axially faces it.

Figure 4:
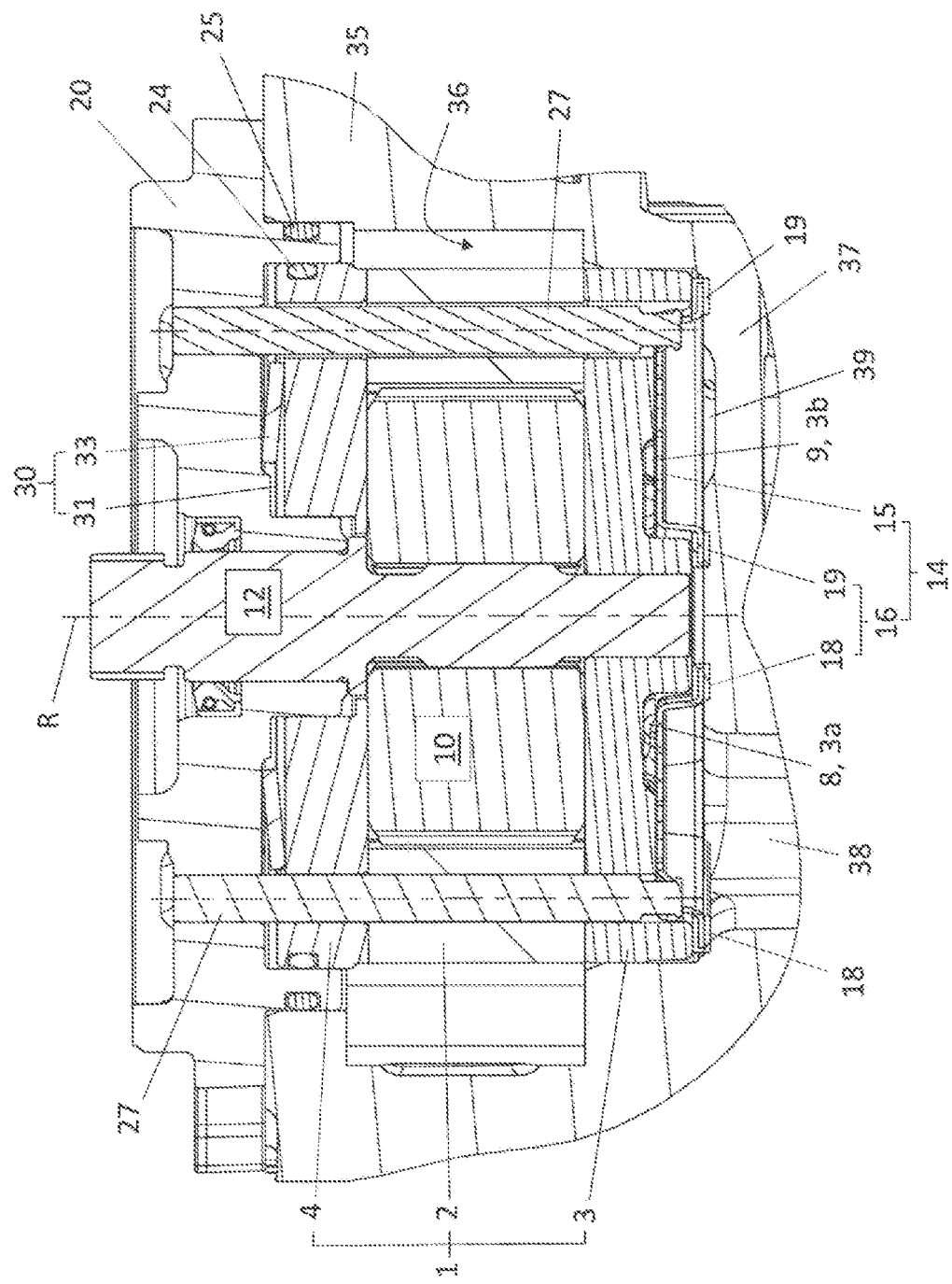
FIG. 4 the longitudinal section C-C of FIG. 1.

FIG. 4 shows the pump fitted, wherein the pump itself is shown in the section C-C of FIG. 1. The pump is arranged on an accommodating device 35. The pump is arranged such that when fitted, it protrudes with the outlet gasket 14 first into an accommodating well 36 of the accommodating device 35. The fitting structure 20 serves to fix the pump, at least axially and preferably completely, on the accommodating device 35. In the example embodiment, the fitting structure 20 is fixedly screwed, when fitted, to the accommodating device 35 by means of a plurality of fastening screws which extend through the fastening elements 29 (FIG. 1). Alternatively, other types of fixation, for example a latching connection, can also in principle be implemented. The accommodating device 35 has an attaching wall 37 which is axially facing when the outlet gasket 14 is fitted and forms a base of the accommodating well 36. A first pressure port 38 for the first pressure outlet 8 and a second pressure port 39 for the second pressure outlet 9 are provided in the attaching wall 37. When the pump is in operation, the pressure fluid of the first working flux is delivered through the first pressure outlet 8 and the adjoining first pressure port 38 to an assembly which is to be supplied with the pressure fluid, while the pressure fluid of the second working flux is delivered through the second pressure outlet 9 and the adjoining second pressure port 39 to another assembly or to the same assembly, and in which case expediently to a different location on the same assembly. The assembly to be supplied can for example be a gearbox, such as for example an automatic gearbox or steering gearbox of a vehicle or a gearbox of a system for generating electrical energy. The fluid is a liquid, such as working oil or lubricating oil, but can in principle also be a gas.

In the first example embodiment, the pressing device 30 acts between the fitting structure 20 and the pump housing 1. The pressing force which can be generated by means of the pressing device 30 acts axially on the pump casing 1 and is supported in the opposite axial direction on the fitting structure 20. The fitting structure 20 and the pump housing 1 axially, and in the example embodiment also radially, delineate an accommodating space 31 in which the pressing device 30 is implemented. The accommodating space 31 is formed in the recess of the fitting structure 20 into which the pump housing 1 protrudes and is delineated in one axial direction by the pump housing 1, namely by the second end-face wall 4. The pressing device 30 comprises a hydraulic device for generating a hydraulic pressing force. For the hydraulic device, the accommodating space 31 forms a pressure chamber for a pressure fluid and is also referred to in the following as a pressure chamber 31. This pressure fluid can in particular be the pressure fluid delivered by the pump. The pressure chamber 31 can then be connected to the high-pressure side of the first working flux and/or to the high-pressure side of the second working flux, in order to channel pressure fluid from the respective working flux into the pressure chamber 31. The relevant fluid connection can be implemented as a permanent fluid connection or as a switchable or controllable fluid communication. In simple and not least for this reason preferred embodiments, it is a permanent fluid connection, such that the pressure space 31 is permanently connected to the high-pressure side of the first working flux and/or to the high-pressure side of the second working flux when the pump is in operation. In advantageous embodiments, the pressure chamber 31 is connected to the high-pressure side of the delivery chamber 5 within the pump housing 1 (FIGS. 1 and 3).

In addition to the hydraulic device, the pressing device 30 comprises a spring device 33 for generating a spring force which also serves as a pressing force for the outlet gasket 14. The spring device 33 is arranged in the pressure chamber 31. The spring device 33 can be formed as an annular disc spring, as in the example embodiment. The spring device 33 can be seen as an individual component in FIG. 2. Other types of spring can also be used to implement the spring device 33. The spring device can also comprise a plurality of springs for generating the spring force, which can advantageously be arranged in the pressure chamber 31. Implementing the spring device 33 by means of a single disc spring is advantageous with regard to a simple design of the spring device 33 and its robustness. Arranging the spring device 33 in the pressure space 31 is also favourable with regard to a compact, i.e. space-saving design of the pump. The spring device 33 axially acts directly on the pump housing 1 and is supported directly on the fitting structure 20 in the opposite axial direction.

Within the context of the hydraulic device, the pump housing 1 and the fitting structure 20 form a piston-cylinder unit within which the pump housing 1 forms the piston and the fitting structure 20 forms the cylinder. A pressure space gasket 24 which is arranged in the circumferential gap between the second end-face wall 4 and the outer collar 23 of the fitting structure 20 seals off the pressure space 31 from the low-pressure side of the pump. An installation space gasket 25 which, as can be seen in FIG. 4, serves to seal off the accommodating well 36 also extends over the outer circumference of the outer collar 23. When fitted, an annular space which circumferentially remains around the outer circumference of the pump housing 1 in the accommodating well 36 is filled with the fluid of the low-pressure side when the pump is in operation, i.e. the fluid flows into the delivery chamber 5 via this annular space and the inlets 6 and 7. In typical applications, the pump suctions the fluid from a fluid reservoir into the annular space, such that this space can also be referred to as a suction space in such applications.

As already mentioned, the components of the pump are loosely joined together when pre-fitted. The components, such as in particular the circumferential wall 2, the end-face walls 3 and 4, the fitting structure 20 and the outlet gasket 14, form an axial layered composite within the pre-fitted pump unit and/or fitting unit. This layered composite is held together by a securing device of the pump. The securing device comprises at least one holder 27; in the example embodiment, it comprises a first holder 27 and another, preferably only one other, second holder 27. The respective holder 27 protrudes from the fitting structure 20 in an axial direction in the shape of a rod, firstly protruding through the second end-face wall 4 as viewed from the fitting structure 20, then through the circumferential wall 2 and lastly also through the second end-face wall 3 and is in a holding engagement with the outlet gasket 14. The respective holder 27 can be formed directly on the fitting structure 20 or can be fixedly connected to it in a frictional fit or material fit. The respective holder 27 can in principle protrude through the fitting structure 20 loosely and secured on it only by being tensed axially. In the example embodiment, the respective holder 27 is pressed into the fitting structure 20.

The fitting unit can be held on the fitting structure 20, for example gripped and handled by means of a fitting machine, wherein the pump housing 1 together with the outlet gasket 14 can be held suspended on the fitting structure 20 in the holding engagement between the respective holder 27 and the outlet gasket 14. In addition to the securing and/or holding function, the respective holder 27 can also perform a positioning function since it is arranged eccentrically with respect to the axis of rotation R, in order to position the pump housing 1 and therefore in particular the pressure outlets 8 and 9 in a particular angular position relative to the fitting structure 20. When the pump is in operation, the respective holder 27 can also serve as a guide element for axially guiding the housing structures 2, 3 and 4 of the pump housing 1 relative to each other and/or relative to the fitting structure 20.

Figure 5:
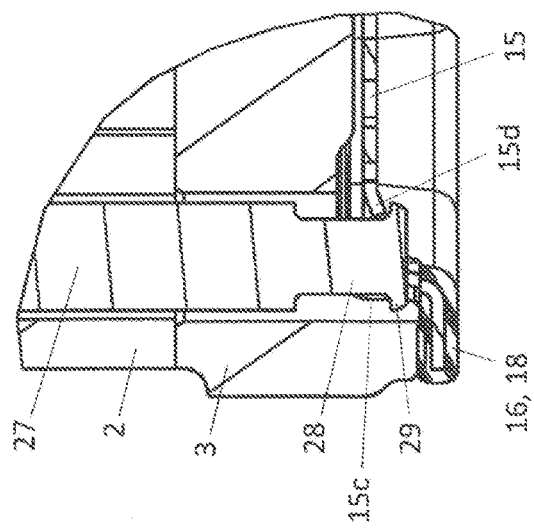
FIG. 5 a holding engagement for forming a pre-fitted pump unit.

FIG. 5 shows the holding engagement between one of the holders 27 and the outlet gasket 14 in detail. The respective holder 27 also protrudes through the outlet gasket 14 in the holding engagement. The outlet gasket 14 is provided with a passage 15c, i.e. one passage 15c for each holder 27, wherein the respective passage 15c is shaped to conform to the corresponding holder 27, in that the respective holder 27 can be guided through the relevant passage 15c of the outlet gasket 14 as viewed from the fitting structure 20, but once guided through, can no longer be retracted. Once the respective holder 27 has been guided through, the outlet gasket 14 acts as a barb in the region of the passage, which prevents the holder 27 from being retracted.

For the holding engagement, the outlet gasket 14 has engaging elements 15d which protrude into the passage 15c from the outer edge of the respective passage 15c, as viewed in an axial plan view. As shown in FIG. 5, the engaging elements 15d can be inclined in the axial insertion direction of the corresponding holder 27. They are elastically flexible. The respective holder 27 is elongated in the shape of a rod, preferably a cylindrical rod, and has an engaging portion 28 in the region of its free end and, axially adjoining it, a complementary engaging element 29 in the form of a radial widening. The complementary engaging element 29 forms the free end of the holder 27. The engaging elements 15d act as flexible tongue-like barbs for the complementary engaging element 29.

When pre-fitting, the second end-face wall 4, the circumferential wall 2 and the first end-face wall 3 are pushed along the holder 27 towards the fitting structure 20. The outlet gasket 14 is also pressed axially against the holders 27 which are widened at their free end, forming complementary engaging elements 29, wherein the complementary engaging elements 29 are inserted axially into the corresponding passage 15c and pressed against the inwardly protruding engaging elements 15d. The engaging elements 15d elastically yield under the pressure of the complementary engaging elements 29 and flex into the holding engagement shown in FIG. 5 once they have been passed by the complementary engaging element 29. The engaging elements 15d come to rest axially behind the respective complementary engaging element 29, i.e. axially in the region of the engaging portion 28 of the respective holder 27, in the holding engagement and prevent the outlet gasket 14 from being able to be axially drawn away from the first end-face wall 3 again. The holding engagement can be adjusted such that the outlet gasket 14 is pressed against the opposite end-face surface of the first end-face wall 3 in the region of the sealing flanges and/or sealing stays 18 and 19 with a certain pressure force. Alternatively, a small axial clearance can be provided.

The support structure 15 forms the respective passage 15c and the engaging elements 15d which protrude into said passage 15c. The gasket structure 16 can form part of a peripheral region of the respective passage 15c.

In the first example embodiment, the outlet gasket 14 acts as an axial gasket in relation to both the pump housing 1 and the attaching wall 37. This can be clearly seen in FIG. 4. In performing its sealing function, the outlet gasket 14 is compressed between an outer end-face surface of the first end-face wall 3 and an axially facing end-face surface of the attaching wall 37 along a first sealing stay 18 and a second sealing stay 19 when the pump is fitted.

The first end-face wall 3 has a first recess 3a and another, second recess 3b on its outer end-face surface. The recesses 3a and 3b cover most of the outer end-face side of the end-face wall 3. They are advantageously symmetrical, in the plan view, in relation to a straight line intersecting the axis of rotation R. They are semi-circular in the example embodiment, but can for example respectively extend around the axis of rotation R in an arcuate and/or reniform shape in modifications. The first pressure outlet 8 (FIG. 2) emerges in the recess 3a. The second pressure outlet 9 (FIG. 2) emerges in the recess 3b. The outlet gasket 14 has a gasket flange, a first bulge 15b (FIG. 3) protruding from the gasket flange, and a second bulge 15b protruding from the gasket flange. The gasket flange forms the first sealing stay 18 and the second sealing stay 19. In the example embodiment, the support structure 15 forms the bulges 15b and, circumferentially around each of them, a support flange 15a. The flange 15a of the support structure 15 is covered on both end-face sides with the gasket material, in order to form the sealing stays 18 and 19 and thus the gasket structure 16. The bulges 15b can be free of gasket material.

In modifications, the support flange 15a can be omitted in portions or completely, and the gasket material alone can form the gasket flange in the form of the sealing stays 18 and 19 in portions or throughout and can for example be moulded or joined directly onto the side walls of the bulges 15b in the shape of a flange. Instead or additionally, gasket material can cover the side walls of the bulges of the support structure 15 in order to improve the purchase of the gasket structure 16 on the support structure 15. In the example embodiment, the outlet gasket 14 is held on the pump housing 1 in engagement with the respective holder 27 when the pump is pre-fitted. Instead or preferably in addition, it can be shaped to conform to the recess 3a and/or the recess 3b and inserted into the respective recess 3a and/or 3b, i.e. held on the end-face wall 3 in a positive fit and a frictional fit, when pre-fitted.

The first bulge 15b protrudes into the first recess 3a, and the second bulge 15b protrudes into the second recess 3b. The first sealing stay 18 extends along the edge of the first recess 3a, and the second sealing stay 18 extends along the edge of the second recess 3b. The sealing stays 18 and 19 rest against the outer end-face surface of the first end-face wall 3 protruding axially in relation to the recesses 3a and 3b and enclose the recesses 3a and 3b in order to seal off the pressure outlet 8 situated in the recess 3a and the pressure outlet 9 situated in the recess 3b. When fitted (FIG. 4), the sealing stay 18 establishes a fluid connection which is sealed, i.e. closed off from the outside, between the first pressure outlet 8 (FIG. 2) and the first pressure port 38. At the same time, the second sealing stay 19 establishes a fluid connection which is sealed, i.e. closed off from the outside, between the second pressure outlet 9 (FIG. 2) and the second pressure port 39. The sealing stays 18 and 19 seal off the respective fluid connection from the other fluid connection in each case and also from the low-pressure side of the pump, including the shaft passage for the drive shaft 12.

Figure 6:
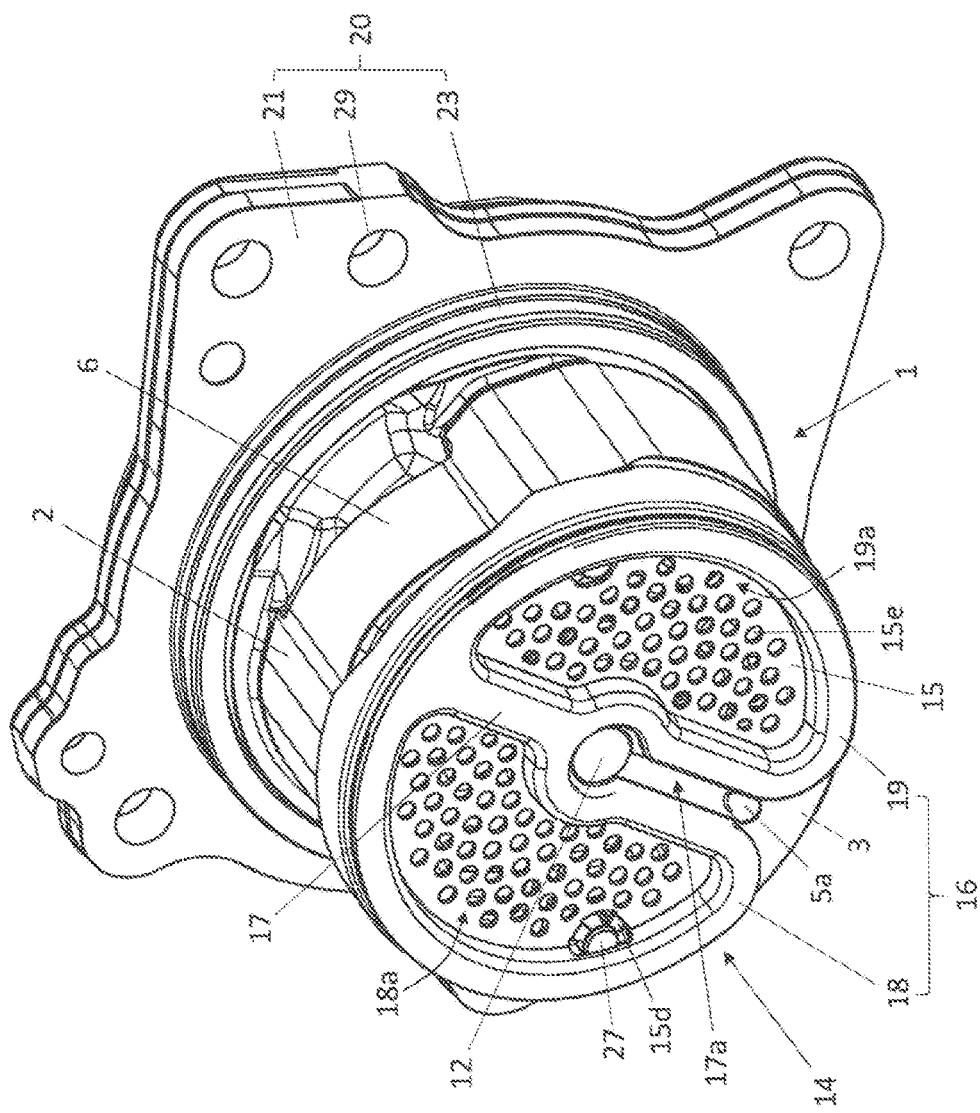
FIG. 6 the pre-fitted pump unit in a view onto an outlet gasket.

FIG. 6 shows the pump as a pre-fitted fitting unit in a perspective view onto the outlet gasket 14. As already mentioned, the outlet gasket 14 comprises the support structure 15 and the sealing stays 18 and 19 which are each formed from the gasket material. As can be seen in the two longitudinal sections in FIGS. 3 and 4, the support structure 15 protrudes as a two-part flat cage into the recesses 3a and 3b which are formed on the outer end-face side of the first end-face wall 3. The two sealing stays 18 and 19 sub-divide the outer end-face surface of the first end-face wall 3 into halves of at least substantially the same size.

The sealing stays 18 and 19 each have an outer, arcuate sealing stay portion which extends on or near to the periphery of the end-face wall 3 and follows the periphery of the end-face wall 3. The arcuate portion of the first sealing stay 18 and the arcuate portion of the second sealing stay 19 merge at the periphery of the outlet gasket 14 and form a common sealing stay portion 17 which extends inwards from a peripheral portion end towards a radially central region of the outlet gasket 14. The end-face wall 3 has a shaft passage in the central region for the drive shaft 12. At an inner portion end which adjoins the central region, near the shaft passage in the example embodiment, the common sealing stay portion 17 bifurcates into a portion of the first sealing stay 18a which extends around the central region on one side of the central region and a portion of the second sealing stay 19 which extends around the central region on the other side of the central region. In the example embodiment, the two portions of the sealing stays 18 and 19 extend around the shaft passage. After each partially encircling the central region of the outlet gasket 14—in this case, the shaft passage—the sealing stays 18 and 19 continue to extend separately from each other, radially outwards again, towards the periphery in order to form the respective sealing stay 18 and 19 in a closed loop. As viewed in an axial plan view, the first sealing stay 18 encloses a first fluid passage 18a for the pressure fluid from the first pressure outlet 8, and the second sealing stay 19 encloses a second fluid passage 19a for the pressure fluid from the second pressure outlet 9. The sealing stays 18 and 19 leave a large traversable cross-section free for the pressure fluid flowing off from each of the pressure outlet 8 and the pressure outlet 9. The two fluid passages 18a and 19a together cover most of the outer end-face surface of the first end-face wall 3. Their common sealing stay portion 17 sub-divides the end-face side of the pump housing 1 into two at least substantially identical hemispheres in which the pressure fluid can be discharged.

As viewed in the plan view, the sealing stays 18 and 19 leave a passage 17a for a lubricating fluid free which extends from the central region of the outlet gasket 14 towards the periphery. The passage 17a extends from the central region of the outlet gasket 14 at least up to a relief channel 5a which extends through the first end-face wall 3 and connects the passage 17a to the low-pressure side of the delivery chamber 5 (FIG. 1). The passage 17a terminates in an opening at the periphery, i.e. it extends further outwards beyond the point at which the relief channel 5a emerges. Lubricating fluid for lubricating the shaft bearing of the drive shaft 12 can thus flow off via the passage 17a and the relief channel 5a into the delivery chamber 5 and/or at the periphery of the outlet gasket 14 into the accommodating well 36 and thus to the low-pressure side of the pump via a short route. It is in particular advantageously fed back through the relief channel 5a which extends in the pump housing 1, directly into the delivery chamber 5. The fluid to be delivered by the pump can advantageously also be the lubricating fluid.

The support structure 15 does not perform the function of a support for the gasket material only. It also serves to reduce pressure spikes when the pressure fluid is cold and therefore comparatively viscous, for example when starting up in a cold start. In order to perform this function, the region of the support structure 15 which extends within the first sealing stay 18 in an axial projection, i.e. in a plan view, and the region of the support structure 15 which extends within the second sealing stay 19 in the plan view are provided with passages 15e. In the example embodiment, the support structure 15 is provided with small, hole-like passages 17, i.e. it is perforated as viewed across the fluid passages 18a and 19a. The support structure 15 acts as a flow resistance, i.e. a throttle or shutter, and thus reduces pressure spikes. When the pump is operating at a warm temperature and the viscosity of the pressure fluid is correspondingly reduced, a certain increase in the flow resistance which is then only slight is no longer significant.

Figure 7:
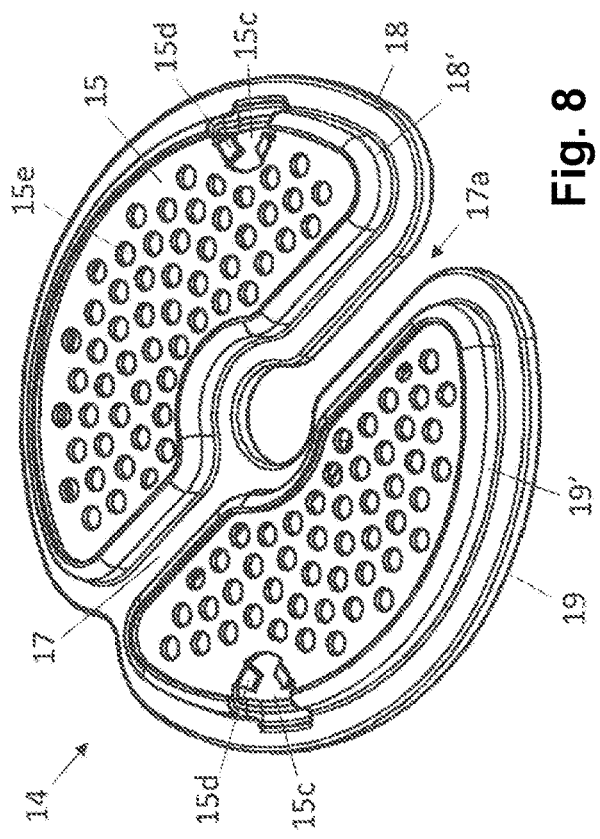
FIG. 7 a perspective view onto an outer end-face side of the outlet gasket.
Figure 8:
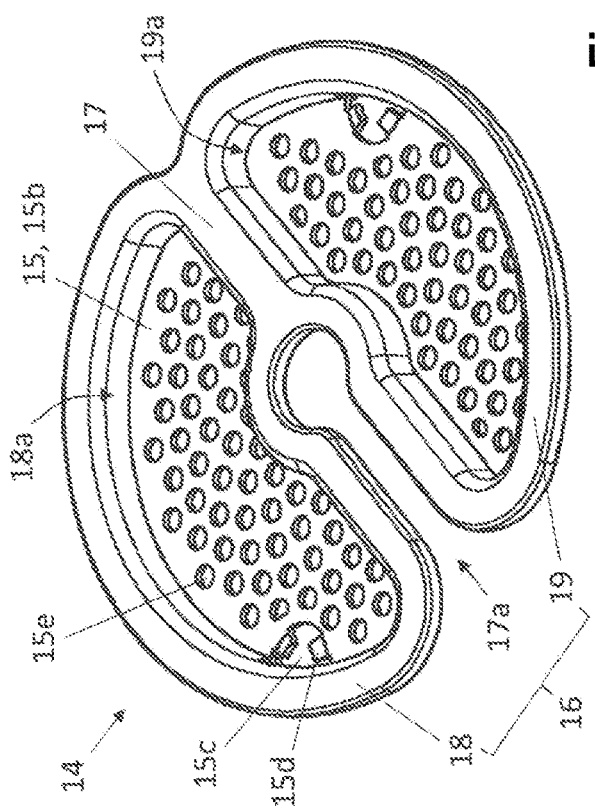
FIG. 8 a perspective view onto an inner end-face side of the outlet gasket.
Figure 9:
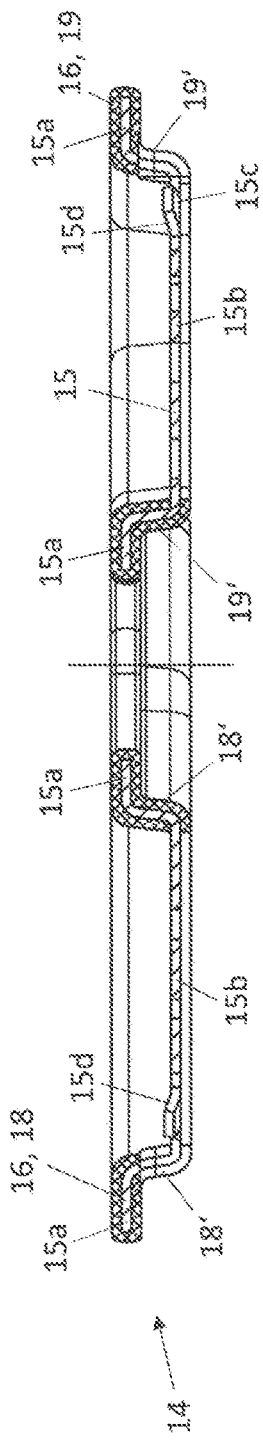
FIG. 9 the outlet gasket in a longitudinal section.

FIGS. 7 to 9 show an outlet gasket 14 itself, before it is arranged on the pump housing 1, wherein FIG. 7 is a perspective view onto the end-face side of the outlet gasket 14 which is the outer end-face side of the outlet gasket 14 when fitted, FIG. 8 is a perspective view onto the end-face side of the outlet gasket 14 which is the inner end-face side of the outlet gasket 14 facing the first end-face wall 3 when fitted, and FIG. 9 is a longitudinal section through the central region and the two passages 15c which serve to provide the holding engagement with a holder 27 in each case when the pump is pre-fitted.

The outlet gasket 14 corresponds to the outlet gasket 14 of FIGS. 2 to 6 in relation to its outer end-face side which can be seen in the perspective view in FIG. 7. The support structure 15, with its two perforated bulges 15b and the securing passages 15c, corresponds to the support structure 15 of the outlet gasket 14 in FIGS. 2 to 6. The longitudinal section in FIG. 9 also shows the flanges 15a which encircle the fluid passages 18a and 19a.

Unlike the outlet gasket 14 in FIGS. 2 to 6, the bulges 15b are also circumferentially covered laterally with the gasket material. These circumferential regions are denoted by 18' and 19'. The bulges 15b are broadened laterally by the gasket material, such that the outlet gasket 14 which is modified in this way can be fitted in the recesses 3a and 3b and held in the recesses 3a and 3b by means of a plug connection, i.e. a frictional fit, via its bulges 15b covered with gasket material in the circumferential regions 18' and 19'. The frictional fit serves to position and hold the outlet gasket 14, in addition to the holding engagement.

FIGS. 7 to 9 also show the engaging elements 15d for securing when the pump is pre-fitted. The engaging elements 15d are projections which protrude into the respective passage 15c from the circumference of the respective passage 15c. In the holding engagement, which is shown in detail in FIG. 5, the engaging elements 15d engage the engaging portion 28 of the respective holder 27 and engage behind the complementary engaging element 29, formed as a widening of the respective holder 27, in the holding engagement, such that the outlet gasket 14 cannot easily be drawn axially out of the holding engagement. The engaging elements 15d are inclined, to facilitate inserting the respective holder 27 in the axial insertion direction. They are formed as flexible tongues, such that they can be flexed away from each other, against an elastic restoring force, by the holder 27 which presses against them when axially inserted, and spring back into the narrower engaging portion 28 after passing the complementary engaging element 29, thus establishing the holding engagement shown in FIG. 5.

Figure 10:
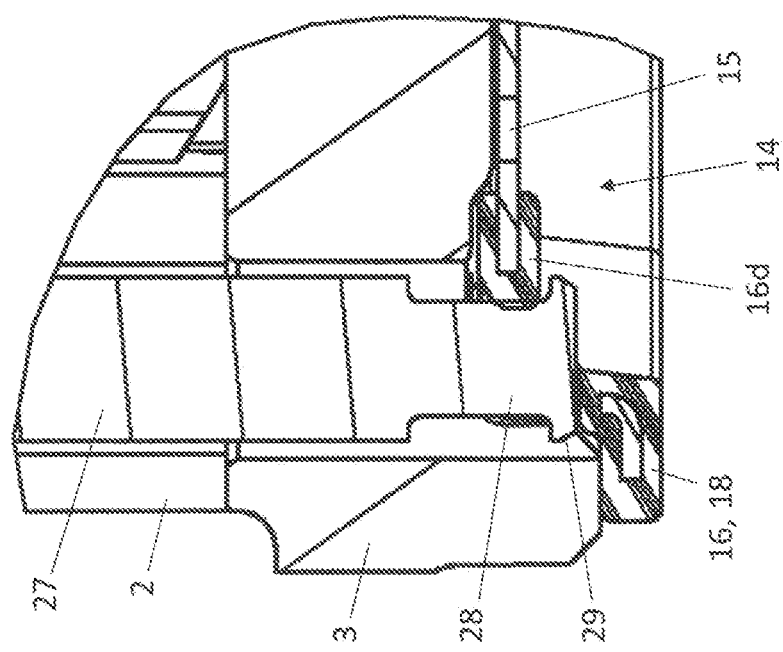
FIG. 10 a modified holding engagement for forming a pre-fitted pump unit.

FIG. 10 shows a longitudinal section, in the region of the holding engagement, of a detail of an outlet gasket 14 which is modified in relation to the holding engagement. The modified outlet gasket 14 differs from the outlet gasket 14 of FIGS. 2 to 6 and the outlet gasket 14 of FIGS. 7 to 9 in that the holding engagement is not established between the holder 27 and the support structure 15, but rather between the holder 27 and the gasket structure 16. While the support structure 15 does have one passage for each holder 27, the respective passage is however circumferentially lined with the gasket material, such that the gasket material forms an engaging element 16d in the region of the passage, wherein said engaging element is elastically compressed by the complementary engaging element 29 of the holder 27 when the outlet gasket 14 is slid on and elastically widens radially into the narrower engaging portion 28 once the complementary engaging element 29 has passed the passage of the outlet gasket 14. The holder 27 corresponds fully and completely to the holder 27 of FIGS. 1 to 9. Aside from the differences explained, the outlet gasket 14 and in principle also the holding engagement of the outlet gasket 14 shown in FIG. 10 also correspond to FIGS. 7 to 9.

Figure 11:
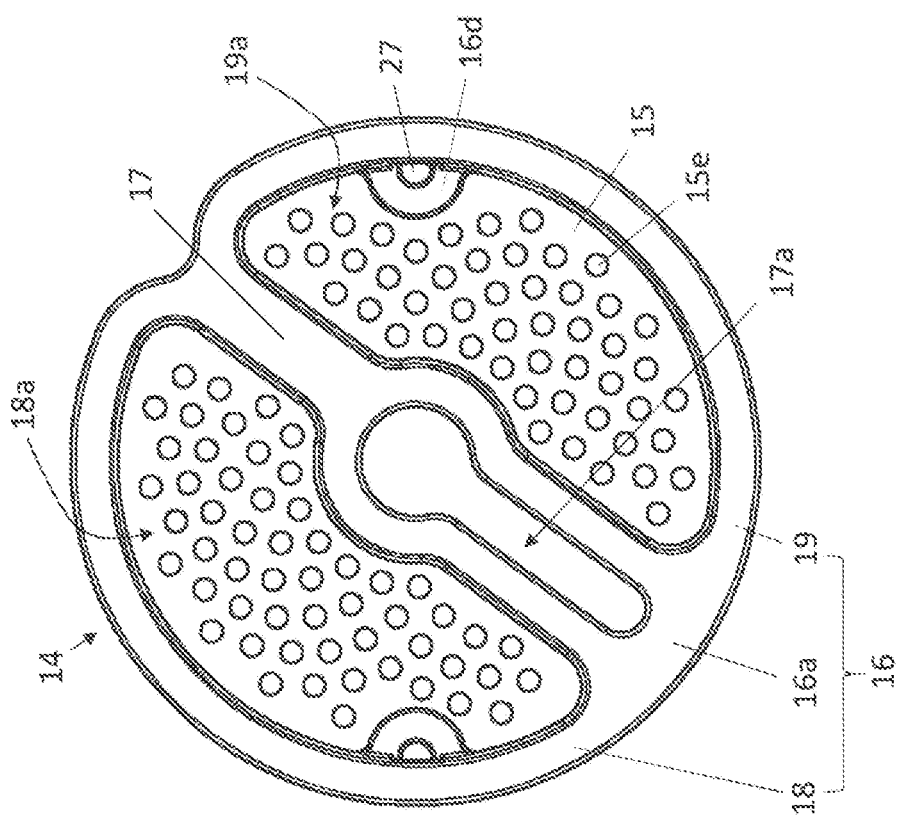
FIG. 11 a modified outlet gasket in a plan view.

FIG. 11 shows a modified outlet gasket 14 in a plan view onto the end-face side which is its outer end-face side when fitted. The modified outlet gasket 14 differs from the outlet gasket 14 of FIG. 6 only in that the passage 17a is closed at the periphery by means of a short sealing portion, and lubricating fluid can therefore only be fed back into the delivery chamber 5 via the relief channel 5a (FIG. 6) which emerges in the passage 17a. The sealing stays 18 and 19 and the short sealing stay portion adjoining the periphery together form a third sealing stay 16a which circumferentially encloses, in the axial plan view, the central region of the outlet gasket 14 and the passage 17a connecting the central region to the relief channel 5a and, when fitted, encloses them in a seal due to an axial sealing contact with the attaching wall 37 (FIG. 4) and thus separates them from the annular space in the accommodating well 36. Aside from the third sealing stay 16a, the modified outlet gasket 14 corresponds to the previously described outlet gasket. The modified outlet gasket 14 can selectively be used instead of the previously described outlet gasket 14.

Figure 12:
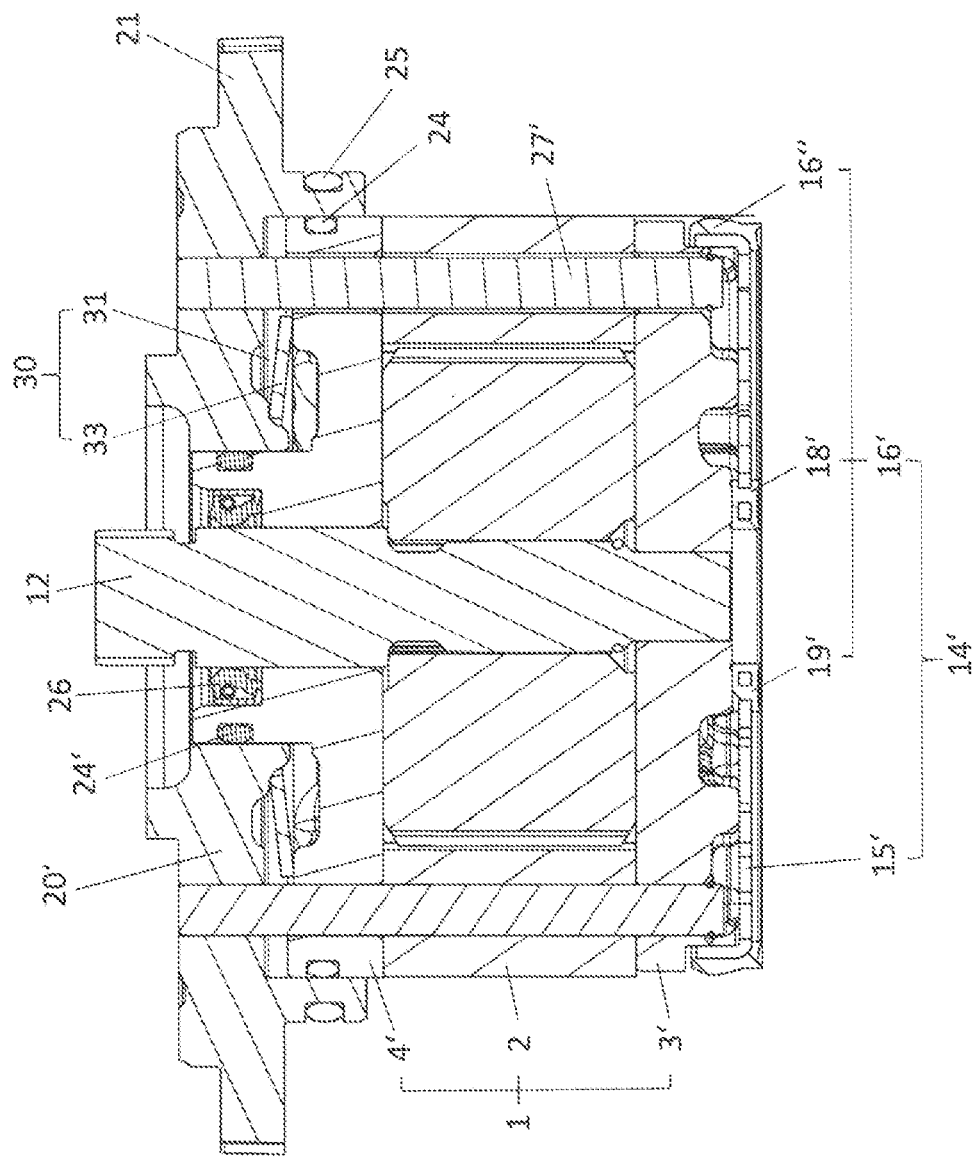
FIG. 12 a pump of a second example embodiment in a longitudinal section.

FIG. 12 shows a pump, which is likewise embodied as a rotary pump, in a second example embodiment which is derived from the first example embodiment. Where the components of the modified pump differ in a significant way from the functionally identical components of the first example embodiment, the reference numerals of the first example embodiment for the relevant components are marked with an apostrophe.

In the second embodiment, the end-face walls 3' and 4' mount the drive shaft 12. The fitting structure 20' does not form a bearing point for the drive shaft 12. Accordingly, a shaft gasket 26 is arranged in the bearing gap between the drive shaft 12 and the second end-face wall 4'. The fitting structure 20' omits the inner collar; instead, an axially protruding collar of the second end-face wall 4' protrudes, which simultaneously forms a socket for the drive shaft 12, protrudes into a central passage of the fitting structure 20'. The pressure space 31, which is formed between the pump housing 1 and the fitting structure 20' as in the first example embodiment, is sealed off on the radially inner side by means of an inner pressure space gasket 24' which is arranged between the end-face wall 4' and the fitting structure 20'. The pressure space 31 is sealed off on the radially outer side by means of the pressure space gasket 24, as in the first example embodiment.

A modified outlet gasket 14' is arranged on the outer end-face side of the first end-face wall 3'. Unlike the first example embodiment, the first end-face wall 3' which is provided with the pressure outlets 8 and 9 as in the first example embodiment does not have any large-volumed recesses 3a and 3b. Accordingly, the outlet gasket 14' has a modified support structure 15' which is at least substantially formed as a planar thin disc and only has an axially projecting edge circumferentially at its outer circumference, such that it has the shape of a flat cover with a cavity in the central region around the shaft passage. The outlet gasket 14' is fitted onto the first end-face wall 3' in the region of the protruding edge of the support structure 15' and held there in a frictional fit. The holders 27' hook onto the first end-face wall 3' in order to hold the components of the fitting unit together when pre-fitted and to position them in a particular angular position with respect to the fitting structure 20'.

The outlet gasket 14' has a gasket structure 16' comprising sealing stays 18' and 19' which have the same profile in the plan view as the sealing stays 18 and 19 of the first example embodiment. Additionally, the gasket structure 16' circumferentially has an outer radial sealing stay 16" on the radially outer side, which is contiguous with the sealing stays 18' and 19' and covers the outer side of the projecting edge of the support structure 15'. As in the first example embodiment, the outlet gasket 14' co-operates with both the pump housing 1 and the attaching wall 37 of the accommodating device 35 (FIG. 4), as an axial gasket in each case. Additionally, its outer radial sealing stay 16" can act as a radial gasket, when fitted.

Figure 13:
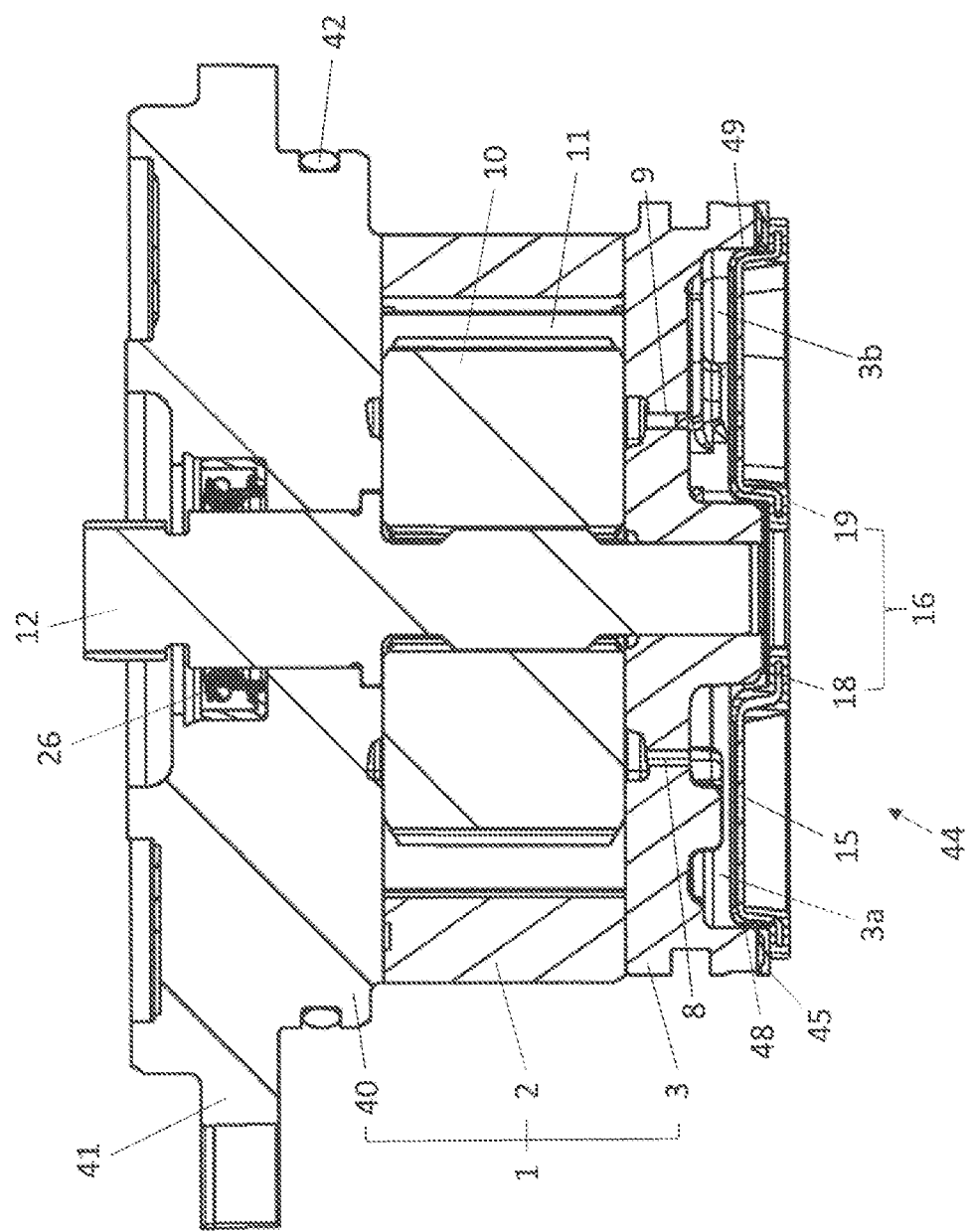
FIG. 13 a pump of a third example embodiment in a longitudinal section.

FIG. 13 shows a pump of a third example embodiment in a longitudinal section. In the third example embodiment, the pump is again a rotary pump. It differs from the pumps of the first and second example embodiments in that it has an outlet gasket 44 which is supported on the pump housing 1, such that it can be axially moved relative to the pump housing 1, via a pressing device 45.

In the third example embodiment, a fitting structure is not provided in addition to the pump housing 1. The second end-face wall 4 of the previous example embodiments is instead replaced with a second end-face wall 40 which simultaneously serves as a fitting structure. The pump is fastened to the accommodating device 35 (FIG. 4) by means of the second end-face wall 40. For the purpose of fitting, the second end-face wall 40 has a radially protruding flange 41, in the region of which fastening elements 29 are provided which, as in the previous example embodiments, can be formed as passages for fastening screws, for example. In the axial portion which protrudes into the accommodating well 36 when fitted, a design space gasket 42 surrounds the second end-face wall 40 in order to seal off the accommodating well 36 and/or the suction space formed within it from the outer environment. The layered design of the pump housing 1 comprising the circumferential wall 2, the first end-face wall 3 and the second end-face wall 40 otherwise corresponds to the housing design of the previous example embodiments. The rotor 10 comprising the vanes 11, and the drive shaft 12, likewise correspond to the functionally identical components of the previous example embodiments.

As in the previous example embodiments, the pump of the third example embodiment is a dual-circuit pump and therefore has a first pressure outlet 8 and a second pressure outlet 9, corresponding to the first example embodiment. The first end-face wall 3 corresponds at least substantially to the first end-face wall 3 of the first example embodiment and, like said first end-face wall, has a recess on its outer end-face surface which is a first recess 3a in the plan view and in which the first pressure outlet 8 emerges, and a second recess 3b in which the second pressure outlet 9 emerges. The statements made with respect to the recesses 3a and 3b of the first example embodiment apply with respect to these recesses 3a and 3b.

The axially movable outlet gasket 44 has a support structure 15 corresponding to the first example embodiment and a gasket structure 16 made of the gasket material which forms a first sealing stay 18 for the first working flux and the first pressure outlet 8 and a second sealing stay 19 for the second working flux and the second pressure outlet 9. The sealing stays 18 and 19 correspond to the profile in accordance with the sealing stays 18 and 19 of the first example embodiment and act, together with the attaching wall 37 of the accommodating device 35, as an axial gasket.

The outlet gasket 44 differs from the outlet gasket 14 in that it forms a radial gasket with the circumferential walls, i.e. with the inner circumference surfaces, of each of the recesses 3a and 3b. Accordingly, the gasket material not only forms the sealing stays 18 and 19, but also covers the support structure 15 in the region of the bulges 15b which protrude into the recesses 3a and 3b in order to form the respective radial gasket with the circumferential wall of the respective recess 3a and 3b. The radial sealing stays which act as a radial gasket are denoted by 48 for the first working flux and/or first recess 3a and by 49 for the second working flux and/or second recess 3b.

The radial sealing stays 48 and 49 are shaped to conform to the profile of the inner circumferential surfaces of the recesses 3a and 3b, such that they circumferentially seal off the recesses 3a and 3b at the inner circumferential surfaces and thus separate the pressure outlets 8 and 9 both from each other and each from the low-pressure side of the pump. The inner end-face side of the outlet gasket 44 which axially faces the pump housing 1 can broadly correspond to the outlet gasket 14 in FIGS. 7 to 9. The radial sealing stays 48 and 49 then correspond to the circumferential regions 18' and 19' which are covered with the gasket material, wherein however the radial sealing stays 48 and 49, unlike the circumferential regions 18' and 19', are not interrupted by passages 15c. In order to form functionally identical passages 15c, such passages can either be arranged in the outlet gasket 44 nearer the central region than is the case in the outlet gasket 14 in FIGS. 7 to 9 or the recesses 3a and 3b and accordingly also the radial sealing stays 48 and 49 can locally bulge further outwards in the region of the passages 15c in order to obtain the radial sealing stays 48 and 49 over the full circumference without any interruptions. The bulges 15b and the sealing stays 48 and 49 expediently have a greater height in the axial direction, as measured from the axial sealing stays 18 and 19, than the protrusions 15b and circumferential regions 18' and 19' of the outlet gasket 14 in FIGS. 7 to 9, in order to compensate on the one hand for the arrangement of the pressing device 45 and, on the other, to ensure that the bulge 15b is radially sealed despite being able to axially move relative to the first end-face wall 3. Aside from the differences explained, the outlet gasket 44 corresponds to the outlet gasket 14 of the first example embodiment and in particular to the modified outlet gasket 14 in FIGS. 7 to 9.

The pressing device 45 is a spring device. The pressing force is generated in a purely mechanical way.

Figure 14:
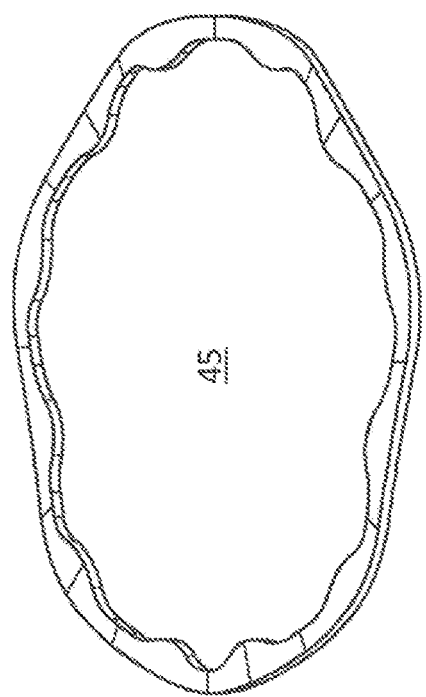
FIG. 14 the pressing device of the pump of the third example embodiment.

FIG. 14 shows the pressing device 45 individually, i.e. when not installed. It is embodied as an annular wave spring.

The pressing device 45 acts on the outlet gasket 44 in the region of the peripheral stay portions of the sealing stays 18 and 19 in order to press it axially against the facing attaching wall 37 in all operating states of the pump and so ensure that the two working fluxes are sealed off from each other and from the low-pressure side of the pump. When installed, a spring end-face side of the pressing device 45 rests against the gasket flange on the outer circumference of the outlet gasket 44, and its other spring end-face side is supported on an axially opposite outer end-face surface region of the first end-face wall 3. The pressing device 45 overlaps with the peripheral portions of the sealing stays 18 and 19, such that the pressing force generated as a spring force acts on the sealing stays 18 and 19 without any radial offset in the relevant stay portions.

Figure 15:
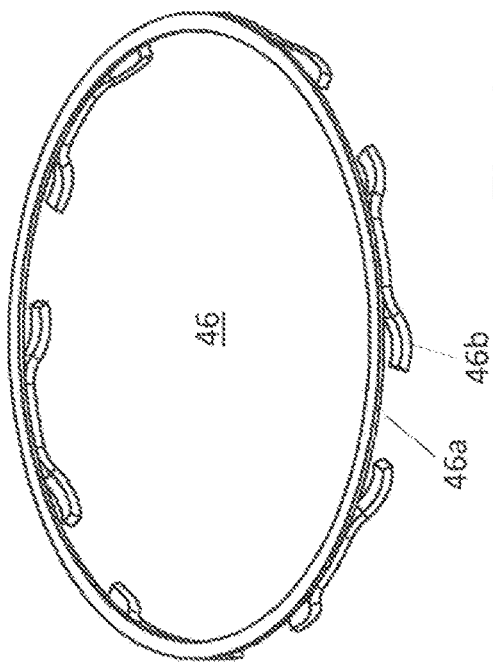
FIG. 15 a modified pressing device for the pump of the third example embodiment.

FIG. 15 shows a pressing device 46 which can be used as an alternative to the pressing device 45 and which can also be arranged in a similar way to the pressing device 45. The pressing device 46 can simply replace the pressing device 45 in the third example embodiment. The pressing device 46 has a pressing ring 46a, which is advantageously a planar pressing ring 46a and which serves to rest against the outlet gasket 44, and a plurality of spring elements 46b which are arranged in a distribution over the circumference of the pressing ring 46a at equal angular intervals and which, when installed, rest against the first end-face wall 3 in order to axially support the pressing ring 46a and therefore the outlet gasket 44 flexibly on the first end-face wall 3. The spring elements 46b are shaped and arranged on the pressing ring 46a such that the spring forces generated by the spring elements 46b when they are axially compressed act axially and with no offset on the pressing ring 46a and thus on the peripheral portions of the sealing stays 18 and 19.

Figure 16:
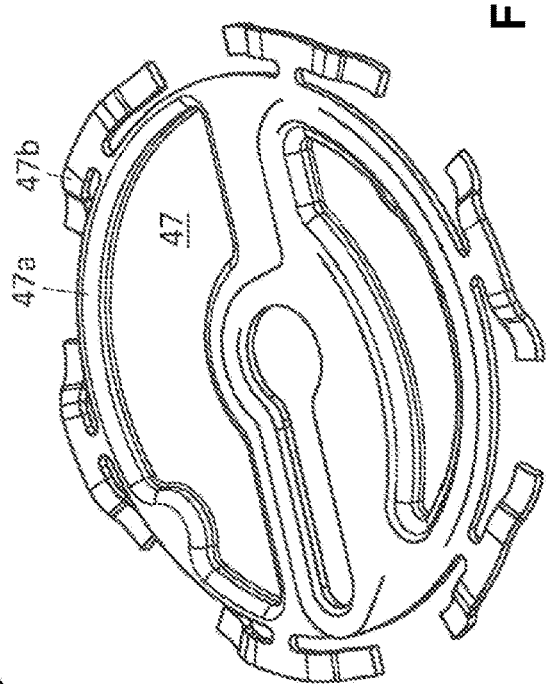
FIG. 16 another, modified pressing device.

FIG. 16 shows a pressing device 47 which has been modified again. The pressing device 47 simultaneously forms, in an integrated design, a support structure for an outlet gasket which, as a design unit, also has the sealing stays made of gasket material which are necessary for sealing off the working fluxes. The gasket structure comprising the sealing stays is not shown in FIG. 16. In an axial plan view, the support structure 47a has the shape of the sealing stays 18 and 19 of the outlet gasket 14 shown in FIG. 11. Accordingly, it circumferentially comprises a peripheral ring and structural portions for supporting the sealing stay portion 17 which is a common sealing stay portion in FIG. 11 and the two other sealing stay portions which laterally delineate the passage 17a. A plurality of spring elements 47b project from the ring in a uniform distribution over the circumference. The sealing stays required for performing the sealing function are joined to the support structure 47a and follow its profile or are moulded onto the support structure 47a, for example in a plastic injection-moulding method, and follow its profile, wherein a thermoplastic elastomer is then preferably used as the gasket material.

REFERENCE SIGNS

1 housing
2 circumferential wall
3 end-face wall
3a recess
3b recess
4 end-face wall
5 delivery chamber
5a relief channel
6 inlet
6a cavity
6b cavity
7 inlet
7a cavity
8 pressure outlet
8a passage, pressure passage
9 pressure outlet
9a passage, pressure passage
10 rotor
11 vane
12 drive shaft
13 drive wheel
14 outlet gasket
14' outlet gasket
15 support structure
15' support structure
15a flange
15b bulge
15c passage
15d engaging element
15e passage
16 gasket structure
16a sealing stay
16d engaging element
16' gasket structure
16" radial sealing stay
17 sealing stay portion
17a passage
18 sealing stay
18' circumferential region
18a fluid passage
19 sealing stay
19' circumferential region
19a fluid passage
20 fitting structure
21 end-face wall
22 inner collar
23 outer collar
24 pressure space gasket
25 design space gasket
26 shaft gasket
27 holder
27' holder
28 engaging portion
29 complementary engaging element
30 pressing device
31 pressure chamber, accommodating space
32-
33 spring device, spring
34-
35 accommodating device
36 accommodating well
37 attaching wall, base
38 pressure port
39 pressure port
40 end-face wall
41 fitting structure
42 design space gasket
43-
44 outlet gasket
45 pressing device
46 pressing device
46a pressing ring
46b spring element
47 pressing device
47a pressing ring
47b spring element
48 radial sealing stay
49 radial sealing stay
R axis of rotation

The invention claimed is:
1. A pump for supplying an assembly with a pressure fluid, the pump comprising:
a pump housing comprising a circumferential wall, which surrounds a delivery chamber of the pump, a first end-face wall and a second end-face wall which delineate the delivery chamber at its end-face sides;

a rotor, which can be rotated about an axis of rotation in the delivery chamber, for forming delivery cells which periodically increase and decrease in size as the rotor rotates, in order to deliver pressure fluid from a low-pressure side of the pump to a high-pressure side of the pump;

a pressure outlet which emerges on an outer end-face side of the first end-face wall facing away from the delivery chamber and through which pressure fluid can be discharged from the delivery chamber;

an outlet gasket which is provided on the outer end-face side of the first end-face wall, for sealing off the pressure outlet;

optionally, a fitting structure which serves to attach the pump to an accommodating device and which can be provided in addition to the pump housing or formed by the second end-face wall; and a holder which is in a holding engagement with the outlet gasket and which positions the circumferential wall and the end-face walls and also the fitting structure, if it is provided in addition to the second end-face wall, relative to each other and axially holds them together as a pre-fitted fitting unit by means of the holding engagement, wherein the pump is embodied as a multi-flux pump and has a first flux comprising the pressure outlet as a first pressure outlet and a second flux comprising a second pressure outlet which emerges on the outer end-face side of the first end-face wall next to the first pressure outlet, the outlet gasket comprises a first sealing stay and a second sealing stay, the first sealing stay surrounds the first pressure outlet in a seal and separates it from the low-pressure side of the pump and from the second pressure outlet, and the second sealing stay surrounds the second pressure outlet in a seal and separates it from the low-pressure side of the pump and from the first pressure outlet.

2. The pump according to claim 1, wherein the fitting unit comprises a pressing device for charging the outlet gasket with an axial pressing force, wherein the pump housing can be axially moved relative to the fitting structure and is axially supported via the pressing device on the fitting structure;

and/or the outlet gasket can be axially moved relative to the pump housing and is axially supported via the pressing device on the pump housing.

3. The pump according to claim 1, wherein the fitting unit comprises a spring device which acts between the pump housing and the fitting structure or between the pump housing and the outlet gasket in an axial direction in order to charge the outlet gasket with an axial spring force and so press it against an attaching wall of the accommodating device which lies axially opposite the outer end-face side of the first end-face wall when fitted.

4. The pump according to claim 1, wherein the holder engages behind the outlet gasket in relation to the axial direction in the holding engagement and so axially holds the fitting unit together.

5. The pump according to claim 4, wherein the holder protrudes at least into an axial passage of the outlet gasket and engages behind the outlet gasket axially immediately behind the passage or in the passage, in relation to the axial direction, in the holding engagement.

6. The pump according to claim 1, wherein an engaging element of the outlet gasket and a complementary engaging element of the holder are in the holding engagement, wherein the engaging element holds the complementary engaging element in relation to the axial direction in the holding engagement.

7. The pump according to claim 6, wherein the engaging element and/or the complementary engaging element is/are flexible in a radial direction against an elastic restoring force, such that the respective elastic restoring force causes the engaging element and/or the complementary engaging element to radially yield and then automatically snap forwards or widen radially into the holding engagement, when the holding engagement is established.

8. The pump according to claim 6, wherein the engaging element holds and engages behind the complementary engaging element in relation to the axial direction in the holding engagement.

9. The pump according to claim 1, wherein the holder protrudes in an axial direction from the fitting structure, if it is additionally provided, or the second end-face wall into the holding engagement.

10. The pump according to claim 9, wherein the holder is connected, such that it cannot be moved, to the fitting structure, if it is additionally provided, or to the second end-face wall.

11. The pump according to claim 1, wherein the holder positions the circumferential wall and the end-face walls and also the fitting structure, if it is provided in addition to the second end-face wall, relative to each other and axially holds them together in the holding engagement in a loose composite as the pre-fitted fitting unit.

12. The pump according to claim 1, wherein the holder is elongated in an axial direction, has a free axial end and is in holding engagement at the free end or axially near the free end.

13. The pump according to claim 1, wherein in addition to the holding engagement, the outlet gasket is held on the first end-face wall in a frictional fit.

14. The pump according to claim 13, wherein the outlet gasket is held on the first end-face wall in the frictional fit by means of an axial plug connection between the outlet gasket and the first end-face wall.

15. The pump according to claim 1, wherein the holding engagement consists of a positive fit connection and/or a frictional fit connection.

16. The pump according to claim 1, wherein the holder extends axially through the circumferential wall of the pump housing and optionally through the first end-face wall and/or the second end-face wall of the pump housing.

17. The pump according to claim 16, wherein the circumferential wall, the first end-face wall and the second end-face wall of the pump housing are produced separately from each other and lie directly on each other in a loose axial contact.

18. The pump according to claim 1, wherein the pump is used as a gear pump for supplying a gearbox with the pressure fluid as a working fluid and/or lubricant.

19. The pump according to claim 1, wherein the outlet gasket comprises a support structure made of a support material, and a gasket structure which is connected to the support structure and made of a gasket material for sealing off the first pressure outlet and the second pressure outlet of the pump, the gasket structure comprising:

the first sealing stay which circumferentially encloses a first fluid passage of the outlet gasket, provided for the first pressure outlet, in a seal in an axial plan view onto the outlet gasket;

the second sealing stay which circumferentially encloses a second fluid passage of the outlet gasket, located laterally next to the first fluid passage, in a seal in the plan view;

and the support structure and/or the gasket structure is in holding engagement with the holder.

20. The pump according to claim 19, wherein the support material has a greater strength and/or hardness and/or modulus of elasticity than the gasket material.

21. The pump according to claim 19, wherein the support structure and the gasket structure are fixedly connected to each other and the support structure extends into the first fluid passage in the plan view, in order to form a flow resistance for pressure fluid flowing through the first fluid passage in the region of the first fluid, passage.

* * * * *